(12) United States Patent
Feng et al.

(10) Patent No.: US 11,786,986 B2
(45) Date of Patent: Oct. 17, 2023

(54) CRAWLING WELDING ROBOT AND METHOD OF CONTROLLING THE SAME

(71) Applicant: Beijing Bo Tsing Tech Co., Ltd, Beijing (CN)

(72) Inventors: Xiaobing Feng, Beijing (CN); Jiluan Pan, Beijing (CN); Lisheng Gao, Beijing (CN); Baiwa Pan, Beijing (CN); Ruimin Duan, Beijing (CN); Hailong Li, Beijing (CN)

(73) Assignee: Beijing Bo Tsing Tech Co., Ltd, Beijing (CN)

( * ) Notice: Subject to any disclaimer, the term of this patent is extended or adjusted under 35 U.S.C. 154(b) by 4 days.

(21) Appl. No.: 16/631,597

(22) PCT Filed: Jul. 9, 2019

(86) PCT No.: PCT/CN2019/095300
§ 371 (c)(1),
(2) Date: Jan. 16, 2020

(87) PCT Pub. No.: WO2020/113956
PCT Pub. Date: Jun. 11, 2020

(65) Prior Publication Data
US 2021/0291289 A1   Sep. 23, 2021

(30) Foreign Application Priority Data

Dec. 7, 2018 (CN) .......................... 201811496503.7

(51) Int. Cl.
*B23K 9/32* (2006.01)
*B23K 9/02* (2006.01)
(Continued)

(52) U.S. Cl.
CPC ................ *B23K 9/327* (2013.01); *B23K 9/02* (2013.01); *B23K 9/0953* (2013.01); *B23K 9/0956* (2013.01); *B23K 9/1274* (2013.01)

(58) Field of Classification Search
CPC .......... B23K 9/02; B23K 9/09; B23K 9/0953; B23K 9/0956; B23K 9/1274; B23K 9/327
See application file for complete search history.

(56) References Cited

U.S. PATENT DOCUMENTS 3,665,187 A * 5/1972 Stein ...................... G01N 23/18
378/91
4,005,305 A   1/1977 Nelson et al.
(Continued)

FOREIGN PATENT DOCUMENTS

| CN | 101863292 A | 10/2010 |
| CN | 201730450 U * | 2/2011 |

(Continued)

OTHER PUBLICATIONS

Machine translation for CN107489854.*
(Continued)

*Primary Examiner* — Helena Kosanovic
*Assistant Examiner* — Ayub A Maye
(74) *Attorney, Agent, or Firm* — DLA PIPER LLP (US)

(57) ABSTRACT

A crawling welding robot, including an adjustable magnetic adhesion module, wheel-tracked walking mechanisms, a crawler frame, and a welding load device, wherein the welding load device is disposed on the crawler frame; the wheel-tracked walking mechanisms are disposed at two opposite ends of the crawler frame for supplying power for crawling of the crawler frame; and the adjustable magnetic
(Continued)

adhesion module is disposed on the crawler frame and disposed between the two wheel-tracked walking mechanisms.

18 Claims, 6 Drawing Sheets

(51) Int. Cl.
    *B23K 9/095*         (2006.01)
    *B23K 9/127*         (2006.01)

(56) References Cited

U.S. PATENT DOCUMENTS

| | | | |
|---|---|---|---|
| 5,045,303 A | | 9/1991 | Wilbur et al. |
| 5,811,055 A | * | 9/1998 | Geiger .................. B23K 9/325 266/49 |
| 8,923,478 B2 | * | 12/2014 | Knight .................. G01N 23/18 250/269.1 |
| 2006/0144835 A1 | * | 7/2006 | Pan .................... B23K 37/0264 219/124.34 |
| 2017/0182605 A1 | * | 6/2017 | Rajagopalan ........ B23K 37/003 |

FOREIGN PATENT DOCUMENTS

| | | | | |
|---|---|---|---|---|
| CN | 102489838 A | | 6/2012 | |
| CN | 10268985 | | 9/2012 | |
| CN | 202622192 | | 12/2012 | |
| CN | 102923205 | | 2/2013 | |
| CN | 102923205 A | | 2/2013 | |
| CN | 103659076 A | | 3/2014 | |
| CN | 204750343 | | 11/2015 | |
| CN | 205769675 | | 12/2016 | |
| CN | 205847902 | | 1/2017 | |
| CN | 206215954 U | * | 6/2017 | |
| CN | 106915389 A | | 7/2017 | |
| CN | 206536447 | | 10/2017 | |
| CN | 107489854 | | 12/2017 | |
| CN | 107489854 A | | 12/2017 | |
| CN | 108482503 A | | 9/2018 | |
| CN | 208085841 | | 11/2018 | |
| CN | 208085841 U | | 11/2018 | |
| CN | 109050822 A | * | 12/2018 | ........... B62D 55/265 |
| CN | 109396700 | | 3/2019 | |
| JP | S57-147172 U | | 9/1982 | |
| JP | S59 094778 U | | 6/1984 | |
| JP | 2005-254999 | | 9/2005 | |
| JP | 59-54178 | | 7/2016 | |
| KR | 20130123954 | | 11/2013 | |
| SU | 774878 | | 10/1980 | |
| SU | 872157 | | 10/1981 | |

OTHER PUBLICATIONS

Machine translation for CN208085841U.*
Written Opinion issued in PCT/CN2019/095300 dated Dec. 10, 2019.
International Search Report issued in PCT/CN2019/095300 dated Dec. 10, 2019.
Decision to Grant a Patent of Application No. JP 2019-569933 dated Jul. 30, 2021.
English Translation of Decision to Grant a Patent of Application No. JP 2019-569933 dated Jul. 30, 2021.
Decision to Grant a Patent of Application No. KR 9-5-2021-069403630 dated Sep. 1, 2021.
English Translation of Decision to Grant a Patent of Application No. KR 9-5-2021-069403630 dated Sep. 1, 2021.
Partial English Abstract of Application No. CN102689085 dated Sep. 26, 2012.
Partial English Abstract of Application No. CN205769675 dated Dec. 7, 2016.
Partial English Abstract of Application No. CN205847902 dated Jan. 4, 2017.
Partial English Abstract of Application No. CN202622192 dated Dec. 26, 2012.
Partial English Abstract of Application No. CN204750343 dated Nov. 11, 2015.
Partial English Abstract of Application No. JP2005254999 dated Sep. 22, 2005.
Partial English Abstract of Application No. CN102689085 Sep. 26, 2012.
Office Action cited in Application No. JP 2019-569933 dated Apr. 27, 2021.
English Translation of Office Action cited in Application No. JP 2019-569933 dated Apr. 27, 2021.
Office Action cited in Application No. KR 9-5-2021-069403630 dated Sep. 9, 2020.
English Translation of Office Action cited in Application No. KR 9-5-2021-069403630 dated Sep. 9, 2020.
Office Action cited in Application No. KR 9-5-2021-032103402 dated Apr. 22, 2021.
English Translation of Office Action cited in Application No. KKR 9-5-2021-032103402 dated Apr. 22, 2021.
Office Action cited in Application No. RU 2019145025/05(086829) dated Dec. 21, 2020.
Search Report and Written Opinion for Singapore Patent Application No. 11202000192T, dated Oct. 18, 2022, 16 pages.

* cited by examiner

CRAWLING WELDING ROBOT AND METHOD OF CONTROLLING THE SAME

CROSS REFERENCE TO RELATED APPLICATIONS

This application is a U.S. National Stage Application of International Application No. PCT/CN2019/095300 filed Jul. 9, 2019, which claims priority to Chinese Patent Application No. 201811496503.7, filed with the Chinese Patent Office (CNIPA) on Dec. 7, 2018, entitled "Crawling Welding Robot and Method of Controlling the Same". The entirety of all the above-listed applications are incorporated herein by reference.

TECHNICAL FIELD

The present disclosure relates to the technical field of welding devices, and in particular to a crawling welding robot and a method of controlling the same.

BACKGROUND ART

In the field of welding of metal structures, when a welding operation is to be performed on large and medium-sized flat or curved equipment such as steel storage tanks, spherical tanks, pipes, and hulls, usually the operation is performed mostly manually, high labor intensity is involved and the working environment is poor, the welding operation needs to be carried out by the cooperation of multiple workers, the welders are required to be highly skilled, and the welding quality cannot be ensured and the productivity is low due to the fact that the welding operation is simultaneously affected by many factors. At present, with the continuous development of welding techniques and the industrial robot technology, the welding robots currently available on the market are mostly articulated.

In the prior art, welding robots cannot perform welding operations on large and medium-sized flat or curved structural members such as steel storage tanks, spherical tanks, and hulls; and when manual welding operation is to be performed on flat or curved surfaces of the large and medium-sized structural members, high labor intensity is involved and the working environment is poor, the welding operation should be carried out by the cooperation of multiple workers, the welders are required to be highly skilled, and the welding quality cannot be ensured and the productivity is low due to the fact that the welding operation is simultaneously affected by many factors.

SUMMARY

Objects of the present disclosure include, for example, providing a crawling welding robot to improve the deficiencies in the prior art, which has high adaptability to the environment and has high operating efficiency.

Objects of the present disclosure also includes, for example, providing a method of controlling a crawling welding robot.

Embodiments of the present disclosure are implemented as follows:

An embodiment of the present disclosure provides a crawling welding robot, comprising an adjustable magnetic adhesion module, wheel-tracked walking mechanisms, a crawler frame, and a welding load device, wherein the welding load device is disposed on the crawler frame;

the wheel-tracked walking mechanisms are disposed at two opposite ends of the crawler frame for supplying power for crawling of the crawler frame; and the adjustable magnetic adhesion module is disposed on the crawler frame and disposed between the two wheel-tracked walking mechanisms.

Optionally, each wheel-tracked walking mechanism comprises a magnetic base, a roller chain, a drive wheel, a driven wheel, and a first driving device;

wherein the first driving device is fixedly disposed on the crawler frame;

both the drive wheel and the driven wheel are rotatably disposed on the crawler frame;

the drive wheel and the driven wheel are connected by the roller chain;

the magnetic base is disposed on the roller chain.

Optionally, the crawler frame is provided with a sliding slot;

the driven wheel is slidably disposed in the sliding slot; and the crawler frame is provided with a second driving device configured to drive the driven wheel to move in the sliding slot so that the corresponding roller chain is tensioned or slackened.

Optionally, the crawler frame comprises an adjusting block and an adjusting screw, wherein the adjusting block is slidably engaged with the sliding slot, the adjusting screw is screwed with the crawler frame, the adjusting screw is rotatably connected with the adjusting block, and the adjusting screw is fixed to the adjusting block in an axial direction of the adjusting screw; when the adjusting screw is rotated, the adjusting block is slidable in the sliding slot; and the driven wheel is rotatably connected with the adjusting block.

Optionally, the crawler frame comprises an adjusting block and an adjusting screw, the adjusting block is slidably engaged with the sliding slot, the adjusting screw is screwed with the crawler frame, and the adjusting screw is fixed to the crawler frame in an axial direction of the adjusting screw, and the adjusting screw is rotatably connected with the adjusting block; when the adjusting screw is rotated, the adjusting block is slidable in the sliding slot; and the driven wheel is rotatably connected with the adjusting block.

Optionally, the first driving device comprises a servo motor and a corner deceleration motor, wherein the servo motor is connected with the corner deceleration motor, both the servo motor and the corner deceleration motor are fixed to the crawler frame, the drive wheel is fixed to a flange of the corner deceleration motor, and the drive wheel can be driven to rotate by the servo motor.

Optionally, the crawler frame comprises a vehicle body connection plate and two side plates which are connected with the vehicle body connection plate and are oppositely disposed, and the two wheel-tracked walking mechanisms are mounted to the two side plates, respectively.

Optionally, the welding load device comprises a weld holder and a welding gun linear oscillating mechanism;

wherein the weld holder is fixedly disposed on the crawler frame;

the welding gun linear oscillating mechanism comprises a first linear motor, a first linear guide rail, a third driving device, a first transmission gear, and a first transmission rack; and the first linear motor is fixedly disposed on the weld holder, and the first linear guide rail is connected with the first linear motor; the first transmission gear is rotatably disposed on the first linear guide rail; the first transmission gear meshes with the first transmission rack, and the first transmission rack is slidably engaged with the first linear guide rail; the third driving device is connected with the first transmission gear for driving the first transmission gear to rotate so as to drive the first transmission rack to reciprocally slide relative to the first linear guide rail.

Optionally, the welding load device further comprises an angular oscillating and clamping mechanism for welding gun;

wherein the angular oscillating and clamping mechanism for welding gun comprises an angular oscillator, a locking mechanism, and a clamp;

the angular oscillator is connected with the clamp for driving a welding gun disposed on the clamp to swing; and the locking mechanism is disposed on the angular oscillator and is fixedly connected with the first transmission rack.

Optionally, the angular oscillator comprises a motor and a rotary platform which are connected with each other, the clamp is connected with the rotary platform, and the locking mechanism is connected with the motor.

Optionally, the welding load device further comprises a laser tracking linear oscillating mechanism and a laser tracking module;

the laser tracking linear oscillating mechanism comprises a second linear motor, a second linear guide rail, a fourth driving device, a second transmission gear, and a second transmission rack; and the second linear motor is fixedly disposed on the weld holder, and the second linear guide rail is connected with the second linear motor; the second transmission gear is rotatably disposed on the second linear guide rail; the second transmission gear meshes with the second transmission rack, and the second transmission rack is slidably engaged with the second linear guide rail; the fourth driving device is connected with the second transmission gear for driving the second transmission gear to rotate so as to drive a linear reciprocating movement of the second transmission rack.

Optionally, the laser tracking module comprises a camera, a laser sensor, a mounting frame, and a multi-filter;

wherein the camera, the laser sensor, and the multi-filter are all disposed on the mounting frame; and the mounting frame is fixedly disposed on the second transmission rack.

Optionally, the crawling welding robot further comprises a windproof device, and the windproof device is connected with the crawler frame;

wherein the windproof device comprises a fixation support and a windshield which are connected with each other, and the fixation support is connected with the weld holder; and the fixation support comprises an retractable translation plate that can be extended and contracted in a frontward and rearward direction, the retractable translation plate is provided with a slideway in a leftward and rightward direction and a slideway in the frontward and rearward direction which have an angle formed therebetween, the windshield is provided with a slideway in an upward and downward direction, the retractable translation plate is connected with the windshield, and the windshield is slippable relative to the retractable translation plate in an extension direction of the slideway in the upward and downward direction and in an extension direction of the slideway in the leftward and rightward direction, so that the windshield can be adjusted in the three directions.

Optionally, the fixation support further comprises a fixed bottom plate and a fixed connection plate which are connected with each other, wherein the fixed connection plate is slidably engaged with the retractable translation plate in an extension direction of the slideway in the frontward and rearward direction; and the fixed bottom plate is configured to be connected with the crawler frame.

Optionally, the retractable translation plate comprises a first plate portion and a second plate portion which are connected with each other, an angle is formed between the first plate portion and the second plate portion, the slideway in the leftward and rightward direction is provided in the first plate portion, and the slideway in the frontward and rearward direction is provided in the second plate portion; the first plate portion is slidably connected with the windshield, and the second plate portion is slidably connected with the fixed connection plate.

Optionally, the adjustable magnetic adhesion module comprises a magnet module and a lifting adjustment module, wherein the lifting adjustment module is connected with the magnet module for controlling lifting and lowering of the magnet module; and the lifting adjustment module comprises a plurality of independently controllable lifting mechanisms, and an angle and/or a gap between the magnet module and a surface to be adhered is changed by separately adjusting the plurality of independently controlled lifting mechanisms.

Optionally, the magnet module comprises a mounting shell, a cover body, and a magnet, wherein the mounting shell is provided with a cavity, the magnet is placed in the cavity, and the cover body is connected with the mounting shell for covering the cavity.

Optionally, each lifting mechanism comprises a support frame, a lifting screw, and an adjusting nut, wherein the support frame is connected with the crawler frame, the lifting screw is screwed with the adjusting nut, the adjusting nut is rotatably connected with the support frame, and the adjusting nut is fixed to the support frame in an axial direction of the adjusting nut; and the lifting screw is connected with the magnet module.

Optionally, the support frame comprises a groove body and a cover plate, wherein the groove body is provided with a limiting groove; the adjusting nut is provided with an annular limiting protrusion, the annular limiting protrusion extends in a circumferential direction of the adjusting nut, and the annular limiting protrusion protrudes outwardly, in a radial direction of the adjusting nut, from an outer circumferential surface of the adjusting nut; the annular limiting protrusion is located in the limiting groove, and the cover plate is connected with the groove body and is configured to cover a groove opening of the limiting groove, so that the annular limiting protrusion is restrained between the groove bottom of the limiting groove and the cover body.

An embodiment of the present disclosure further provides a method of controlling a crawling welding robot, comprising the following steps of:

S1. controlling an adjustable magnetic adhesion module to maintain a stable adhesion force between the crawling welding robot and a surface to be adhered; S2. obtaining information on a weld seam; S3. controlling a welding gun to translate to the position of the weld seam; S4. controlling the welding gun to rotate to an angle required for the process; S5. adjusting process parameters of a welding power source; S6. starting welding and controlling the crawling robot to automatically and autonomously crawl along the direction of the weld seam; and S7. finishing the welding.

The embodiments of the present disclosure bring, for example, the following advantageous effects as compared to the prior art:

In summary, the present disclosure provides a crawling welding robot and a method of controlling the same, wherein the crawling welding robot is enabled by the wheel-tracked walking mechanisms to crawl without rails or guides, has a large weldable range, can move on the surfaces of large and medium-sized flat or curved structural members to be welded, can vertically crawl on the wall, and can perform a welding operation when moving either forward or backward, so that the welding of the large and medium-sized structural members at all positions is achieved, the auxiliary welding time can be significantly reduced, and the production efficiency is high; the magnitude of the magnetic adhesion force is adjusted by the adjustable magnetic adhesion module, so that the crawling welding robot can crawl on a flat plate and a curved plate with large curvature and has high adaptability to the working environment.

BRIEF DESCRIPTION OF DRAWINGS

In order to more clearly illustrate technical solutions of specific embodiments of the present disclosure or in the prior art, drawings required for use in the description of the specific embodiments or the prior art will be described briefly below. It is apparent that the drawings in the following description are merely illustrative of some embodiments of the present disclosure. It will be understood by those of ordinary skill in the art that other drawings can also be obtained from these drawings without any inventive effort.

REFERENCE NUMERALS

Figure 1:
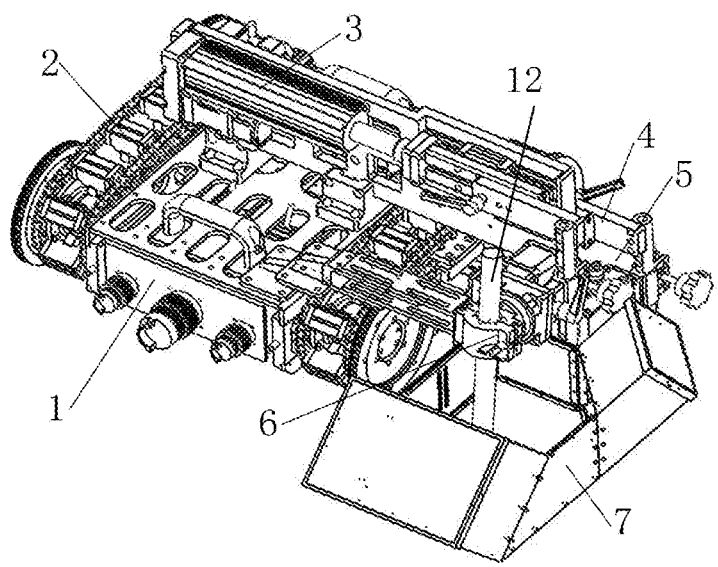
FIG. 1 is a schematic perspective view showing a structure of a crawling welding robot according to an embodiment of the present disclosure.
Figure 2:
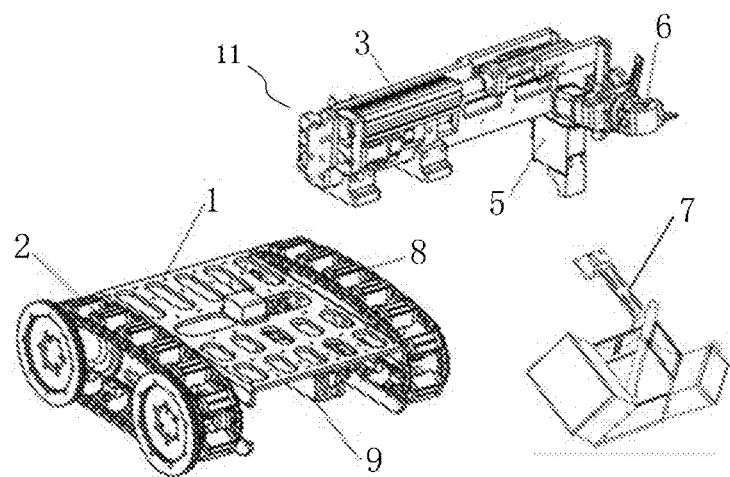
FIG. 2 is an exploded view of a crawling welding robot according to an embodiment of the present disclosure.

1: crawler frame; 1-1: vehicle body connection plate; 1-2: sliding slot; 1-3: adjusting block; 1-4: adjusting screw; 1-5: side plate; 1-6: tensioning mechanism; 2: wheel-tracked walking mechanism; 2-1: drive wheel; 2-2: magnetic base; 2-3: roller chain; 2-4: driven wheel; 2-56: first driving device; 2-5: corner deceleration motor; 2-6: servo motor; 3: welding gun linear oscillating mechanism; 3-1: first linear motor; 3-2: first linear guide rail; 3-3: first transmission rack; 3-4: third driving device; 3-5: first transmission gear; 4: laser tracking linear oscillating mechanism; 4-1: second linear motor; 4-2: second linear guide rail; 4-3: second transmission rack; 4-4: fourth driving device; 4-5: second transmission gear; 5: laser tracking module; 5-1: mounting frame; 5-2: multi-filter; 5-3: laser sensor; 5-4: camera; 6: angular oscillating and clamping mechanism for welding gun; 6-1: angular oscillator; 6-2: locking mechanism; 6-3: clamp; 7: windproof device; 7-1: windshield; 7-2: slideway in upward and downward direction; 7-3: slideway in leftward and rightward direction; 7-4: retractable translation plate; 7-41: first plate portion; 7-42: second plate portion; 7-5: fixed bottom plate; 7-51: fixing hole; 7-6: fixed flange; 7-7: movable flange; 7-8: hinged ball; 7-9: primary observation window; 7-10: secondary observation window; 7-11: slideway in frontward and rearward direction; 7-12: upper press strip; 7-13: lower press strip; 7-14: fixed connection plate; 7-141: first connecting hole; 8: attitude sensor; 9: adjustable magnetic adhesion module; 9-1: driving handle; 9-2: connecting hole; 9-3: cover plate; 9-31: adjusting hole; 9-4: groove body; 9-41: limiting groove; 9-5: support bottom plate; 9-6: lifting screw; 9-7: mounting ear; 9-8: rotating shaft; 9-9: cavity; 9-10: cavity cover; 9-11: rotating hole; 10: weld holder; 11: welding load device; 12: welding gun; 13: fixation support; 14: observation window; 15: magnet module; 15-1: mounting shell; 15-2: cover body; 15-3: magnet; 16: lifting adjustment module; 16-1: support frame; 16-2: adjusting nut; 16-21: annular limiting protrusion.

DETAILED DESCRIPTION OF EMBODIMENTS

The technical solutions of the present disclosure will be described below clearly and completely with reference to the accompanying drawings. It is apparent that the embodiments to be described are some, but not all of the embodiments of the present disclosure. All the other embodiments obtained by those of ordinary skill in the art in light of the embodiments in the present disclosure without inventive efforts shall fall within the scope of the present disclosure as claimed.

The terms "first", "second", and "third" are used for descriptive purpose only, and should not be understood as an indication or implication of relative importance.

In the description of the present disclosure, it should be noted that the terms "mounted", "coupled", and "connected" should be understood broadly unless otherwise expressly specified or defined. For example, a connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

It should be noted that the features in the embodiments of the present disclosure may be combined with each other without conflict.

As shown in FIG. 1 to FIG. 10, the present disclosure provides a crawling welding robot comprising an adjustable magnetic adhesion module 9, wheel-tracked walking mechanisms 2, a crawler frame 1, and a welding load device 11, wherein the welding load device 11 is disposed on the crawler frame 1; the wheel-tracked walking mechanisms 2 are respectively disposed at two opposite ends of the crawler frame 1 for providing the crawler frame 1 with power required for crawling; the adjustable magnetic adhesion module 9 is disposed on the crawler frame 1 and disposed between the two wheel-tracked walking mechanisms 2.

In the present disclosure, the welding robot is driven to move by the wheel-tracked walking mechanism 2, so that the welding robot can travel smoothly without being provided with a rail, and sufficient power for crawling of the welding robot is also ensured. A magnetic force between the adjustable magnetic adhesion module and a surface to be adhered is adjusted by arrangement of the adjustable magnetic adhesion module 9 so that an optimal magnetic force which is not excessively large or excessively small can be achieved, so that it is applicable to different curved surfaces.

Figure 3:
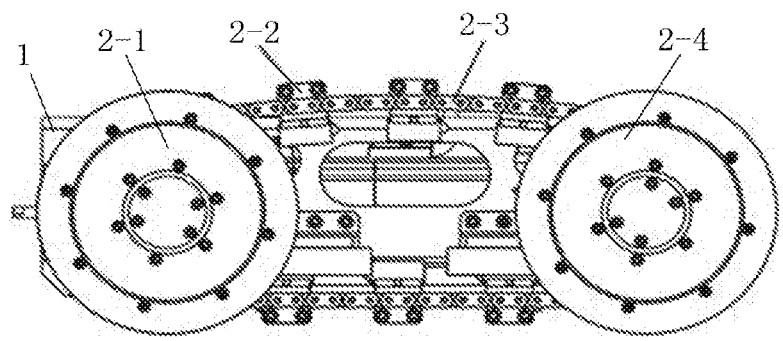
FIG. 3 is a side view of a crawler frame and a wheel-tracked walking mechanism of a crawling welding robot according to an embodiment of the present disclosure.

Referring to FIG. 3, in the present disclosure, optionally, each wheel-tracked walking mechanism 2 comprises a magnetic base 2-2, a roller chain 2-3, a drive wheel 2-1, a driven wheel 2-4, and a first driving device 2-56. The first driving device 2-56 is fixedly disposed on the crawler frame 1, the first driving device is connected with the drive wheel 2-1 for driving a the drive wheel 2-1 to rotate, both the drive wheel 2-1 and the driven wheel 2-4 are rotatably disposed on the crawler frame 1, the drive wheel 2-1 and the driven wheel 2-4 are connected by the roller chain 2-3, and the magnetic base 2-2 is disposed on the roller chain 2-3.

Figure 4:
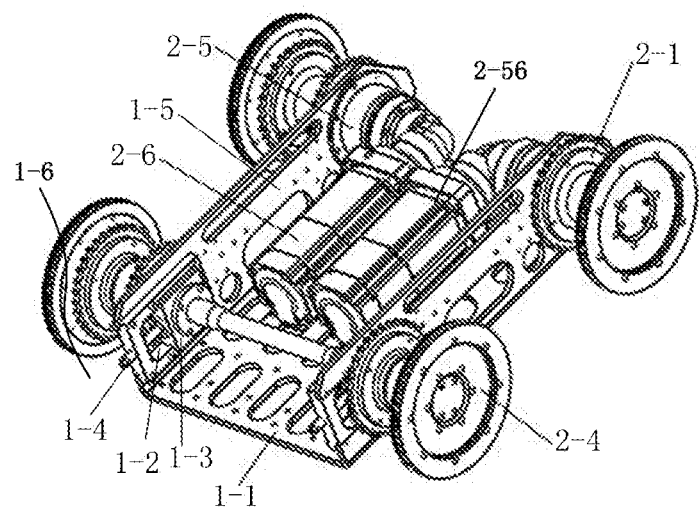
FIG. 4 is a schematic perspective view showing a structure of a crawler frame and a wheel-tracked walking mechanism of a crawling welding robot according to an embodiment of the present disclosure.

Referring to FIG. 4, in the present disclosure, optionally, the crawler frame 1 comprises a vehicle body connection plate 1-1 and side plates 1-5, wherein the first driving device 2-56 is fixedly disposed below the vehicle body connection plate 1-1, both the drive wheel 2-1 and the driven wheel 2-4 are rotatably disposed on the respective side plate 1-5, and the drive wheel 2-1 drives the driven wheel 2-4 to rotate via the roller chain 2-3. Optionally, the connection plate 1-1 is a rectangular plate-like structure provided with a plurality of oval holes, the oval holes penetrate the connection plate 1-1 along a direction perpendicular to a plate surface of the connection plate 1-1, and the plurality of oval holes may be arranged in a rectangular array. The number of the side plates 1-5 is two, the two side plates 1-5 are disposed on two sides of the connection plate 1-1 in a width direction, respectively, and the two side plates 1-5 are both fixedly connected with the connection plate 1-1, and furthermore, a plate surface of each side plate 1-5 is perpendicular to the plate surface of the connection plate 1-1. Each wheel-tracked walking mechanism 2 comprises two roller chains 2-3, two drive wheels 2-1, two driven wheels 2-4, and two first driving devices 2-56, wherein one drive wheel 2-1, one driven wheel 2-2, one roller chain 2-3, and one first driving device 2-56 are regarded as a set to form a walking assembly, and the two walking assemblies are corresponding to the two side plates 1-5, respectively. After the installation of the wheel-tracked walking mechanism 2 is completed, the two roller chains 2-3 of the wheel-tracked walking mechanism 2 are disposed in parallel at an interval. The magnetic base 2-2 is rigidly connected with a lengthened pin on the roller chain 2-3. Optionally, each walking assembly comprises a plurality of magnetic bases 2-2, and the plurality of magnetic bases 2-2 fixedly mounted to the same roller chain 2-3 are arranged at uniform intervals along the circumferential direction of the roller chain 2-3. Correspondingly, the number of the lengthened pins is plural, and the number of the plurality of lengthened pins is in one-to-one correspondence to the number of the plurality of magnetic bases 2-2.

When the crawling welding robot is moving forward, the roller chain 2-3 drags the magnetic bases 2-2 to move, the magnetic base 2-2 at the head end in the forward direction is brought into a state where it is adhered to a structural member from a state where it is separated from the structural member, and at the same time the magnetic base 2-2 at the tail end in the forward direction is brought into the state where it is separated from the structural member from the state where it is adhered to the structural member. During this process, the entire wheel-tracked walking mechanism 2 can maintain a constant total adhesion force, therefore the crawling welding robot can be reliably and stably adhered to the structural member and move relative to the structural member.

When the crawling welding robot is moving backward, the roller chain 2-3 drags the magnetic bases 2-2 to move, the magnetic base 2-2 at the head end in the backward direction is brought into the state where it is adhered to the structural member from the state where it is separated from the structural member, and at the same time the magnetic base 2-2 at the tail end in the backward direction is brought into the state where it is separated from the structural member from the state where it is adhered to the structural member. During this process, the entire wheel-tracked walking mechanism 2 can maintain a constant total adhesion force, therefore the crawling welding robot can be reliably and stably adhered to the structural member and move relative to the structural member.

In the present disclosure, two first driving devices 2-56 are provided, which drive the two drive wheels 2-1 of the two wheel-tracked walking mechanisms 2, respectively, and the two first driving devices 2-56 are disposed independently of each other, and each of the first driving devices 2-56 can be separately controlled, so that different rotational speeds of the drive wheels 2-1 on the left side and the right side of the wheel-tracked walking mechanisms 2 can be achieved, and thereby the steering function of the crawling welding robot can be achieved by using the differential (different velocity) principle.

Optionally, in order to ensure more stable walking of each wheel-tracked walking mechanism 2, a walking (travelling) wheel is disposed on an outer side of each of the drive wheel 2-1 and the driven wheel 2-4, wherein the walking wheel may be a tire. The drive wheel 2-1 is fixed to the respective first driving device 2-56, and the first driving device is fixed to the corresponding side plate 1-5.

In the present disclosure, in order to prevent deviation of the roller chains 2-3 during motion transmission, the vehicle body is provided with a guiding devices, wherein each guiding device is provided with a guiding groove, guiding blocks are mounted to the magnetic bases 2-2, and the guiding blocks are engaged into the guiding grooves respectively during the motion transmission operation performed by the roller chain 2-3 when the vehicle body is moving forward.

Referring to FIG. 4, in the present disclosure, each first driving device 2-56 comprises a servo motor 2-6 and a corner deceleration motor 2-5, wherein the servo motor 2-6 is connected with the corner deceleration motor 2-5, both the servo motor 2-6 and the corner deceleration motor 2-5 are fixed to the crawler frame 1, each drive wheel 2-1 is fixed to a flange of the respective corner deceleration motor 2-5, and each drive wheel 2-1 can be driven in rotation by the respective servo motor 2-6.

Optionally, the corner deceleration motor 2-5 is rigidly fixed to the vehicle body connection plate 1-1, the servo motor 2-6 is fixed to the respective connection plate 1-1, and the servo motor 2-6 drives drive wheel 2-1 to rotate relative to the side plate 1-5 by means of the corner deceleration motor 2-5.

Referring to FIG. 4, in the present disclosure, each side plate 1-5 of the crawler frame 1 is provided with a sliding slot 1-2, and each driven wheel 2-4 is slidably disposed in the respective sliding slot 1-2. A second driving device is disposed on a side wall of the sliding slot 1-2 for driving the respective driven wheel 2-4 to move in the sliding slot 1-2, so as to change a distance between the drive wheel 2-1 and the driven wheel 2-4 located on the same side plate 1-5, thereby realizing tensioning or slackening of the respective roller chain 2-3. For example, when the driven wheel 2-4 slides in the sliding slot 1-2 so that the distance between the driven wheel 2-4 and the drive wheel 2-1 is increased, the roller chain 2-3 can be tensioned; or when the driven wheel 2-4 slides in the sliding slot 1-2 so that the distance between the driven wheel 2-4 and the drive wheel 2-1 is decreased, the respective roller chain 2-3 can be slackened.

The driven wheel 2-4 is driven by the second driving device to slide in the sliding slot 1-2, so that the distance between the driven wheel 2-4 and the drive wheel 2-1 is adjustable, and thereby the tensioning of the roller chain 2-3 can be realized by a corresponding tensioning mechanism 1-6.

Referring to FIG. 4, optionally, the tensioning mechanism 1-6 comprises an adjusting block 1-3 and an adjusting screw 1-4; wherein the driven wheel 2-4 is rotatably disposed on the adjusting block 1-3, the adjusting block 1-3 is slidably disposed in the sliding slot 1-2, and one end of the adjusting screw 1-4 is rotatably connected with the adjusting block 1-3 and is axially positioned relative to the adjusting block 1-3, in other words, the adjusting screw 1-4 is fixed relative to the adjusting block 1-3 in the axial direction of the adjusting screw 1-4. A through hole is provided in a side wall of the sliding slot 1-2 in the direction of sliding of the adjusting block 1-3, wherein the through hole may be a threaded hole, the adjusting screw 1-4 is screwed with the threaded hole, and an end of the adjusting screw 1-4 remote from the adjusting block 1-3 protrudes from the threaded hole. When the adjusting screw 1-4 is rotated, the adjusting screw 1-4 is axially moved because the adjusting screw 1-4 is engaged with the threaded hole. Since the adjusting block 1-3 and the adjusting screw 1-4 are axially positioned relative to each other, the adjusting block 1-3 is axially moved together with the adjusting screw 1-4 so as to achieve the movement of the driven wheel 2-4. The second driving device is connected with the adjusting screw 1-4 for driving the adjusting screw 1-4 to rotate relative to the through hole.

In the present disclosure, optionally, the adjusting screw 1-4 may also be disposed in such a manner that one end of the adjusting screw is in threadedly connected with the adjusting block 1-3, the other end of the adjusting screw protrudes from the side wall of the sliding slot 1-2, and the adjusting screw 1-4 is rotatably connected with the sliding slot 1-2, and the adjusting screw 1-4 and the sliding slot 1-2 are axially positioned relative to each other, in other words, the adjusting screw 1-4 is fixed relative to the sliding slot 1-2 in the axial direction of the adjusting screw 1-4. With such arrangement, when the adjusting screw 1-4 is rotated relative to the sliding slot 1-2 about its own axis, it is not axially moved, and since the adjusting screw 1-4 is threadedly connected with the adjusting block 1-3, the adjusting block 1-3 will move in the sliding slot 1-2 along the axis of the adjusting screw 1-4 to achieve the purpose of driving a linear movement of the driven wheel 2-4 so as to finally realize the adjustment of tensioning or slackening of the roller chain 2-3.

In the present disclosure, when each driven wheel 2-4 moves away from the respective drive wheel 2-1, a tensioning function can be achieved, and when the driven wheel 2-4 moves towards the drive wheel 2-1, the respective roller chain 2-3 can be slackened so as to facilitate the detachment and mounting of the roller chain 2-3.

Figure 6:
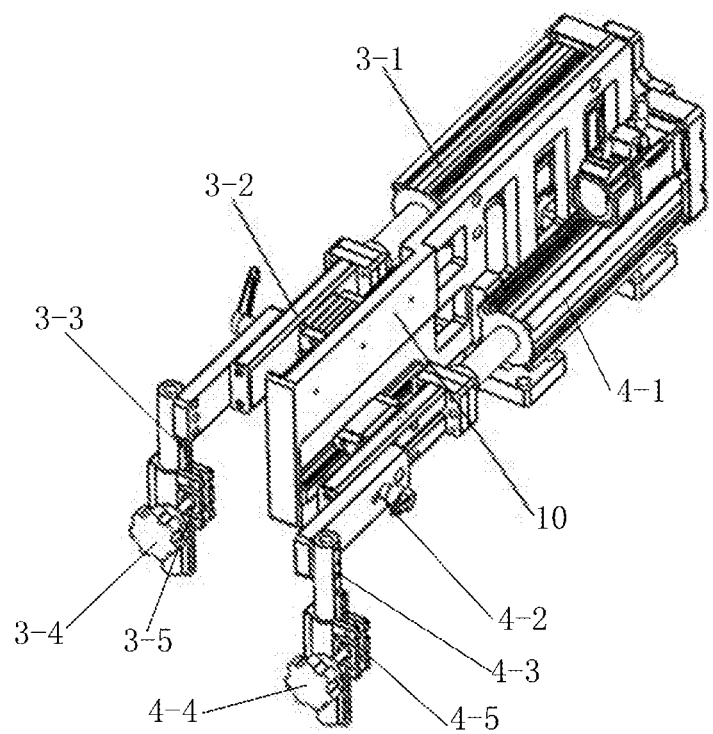
FIG. 6 is a schematic view showing a structure of a welding gun linear oscillating mechanism and a laser tracking linear oscillating mechanism of a crawling welding robot according to an embodiment of the present disclosure.

Referring to FIG. 6, optionally, the welding load device 11 comprises a weld holder 10 and a welding gun linear oscillating mechanism 3; wherein the weld holder 10 is fixedly disposed on the vehicle body connection plate 1-1 of the crawler frame 1; the welding gun linear oscillating mechanism 3 comprises a first linear motor 3-1, a first linear guide rail 3-2, a third driving device 3-4, a first transmission gear 3-5, and a first transmission rack 3-3. The first linear motor 3-1 is fixedly disposed on the weld holder 10, and the first linear guide rail 3-2 is connected with the first linear motor 3-1; the first transmission gear 3-5 is rotatably disposed on the first linear guide rail 3-2, the first transmission rack 3-3 is slidably connected with the first linear guide rail 3-2, and the first transmission gear 3-5 is meshed with the first transmission rack 3-3. The third driving device 3-4 is connected with the first transmission gear 3-5, and the third driving device 3-4 is used configured to drive a rotation of the first transmission gear 3-5 so as to further drive the first transmission rack 3-3 to reciprocally slide relative to the first linear guide rail 3-2.

Optionally, the first linear motor 3-1 can drive a linear movement of the first linear guide rail 3-2 on the weld holder 10 in an x direction, in other words, the first linear motor 3-1, the first linear guide rail 3-2, and the weld holder 10 collectively constitute a screw transmission structure; the first transmission gear 3-5 rotatably disposed on the first linear guide rail 3-2 is engaged with the first transmission rack 3-3 slidably disposed on the first linear guide rail 3-2 to drive a welding gun 12 disposed on the first transmission rack 3-3 to move up and down in a z direction, so that the adjustment of the position of the welding gun 12 in the x direction and in the z direction can be achieved. Additionally, the wheel-tracked walking mechanisms 2 can travel along a y direction, thus the adjustment of the position of the welding gun 12 in the y direction is achieved, and the adjustment of the position of the welding gun 12 in three-dimensional directions is finally achieved.

Optionally, the x direction is set to be parallel to the surface to be adhered and perpendicular to a walking direction of the wheel-tracked walking mechanism 2, the y direction is set as the walking direction of the wheel-tracked walking mechanism 2, and the z direction is set as a direction perpendicular to the surface to be adhered.

The welding gun linear oscillating mechanism 3 is provided such that the welding gun 12 can be accurately aligned with a position to be welded when the crawling welding robot is performing a welding operation, and thus the welding quality can be improved.

In the present disclosure, the third driving device 3-4 may be a handle or a turntable, the handle or the turntable can be manually rotated so as to drive the first transmission gear 3-5 to rotate and drive the first transmission rack 3-3 meshed with the first transmission gear 3-5 to slide such that the adjustment of the position of the welding gun 12 in the y direction is finally achieved, in other words, the adjustment of the height of the welding gun 12 is finally achieved.

It should be noted that the third driving device 3-4 may also be a motor, the motor is connected with a controller so as to achieve an automatic adjustment of the height of the welding gun 12, or the motor is remotely controlled using the controller so as to achieve a remote adjustment of the height of the welding gun 12.

Figure 8:
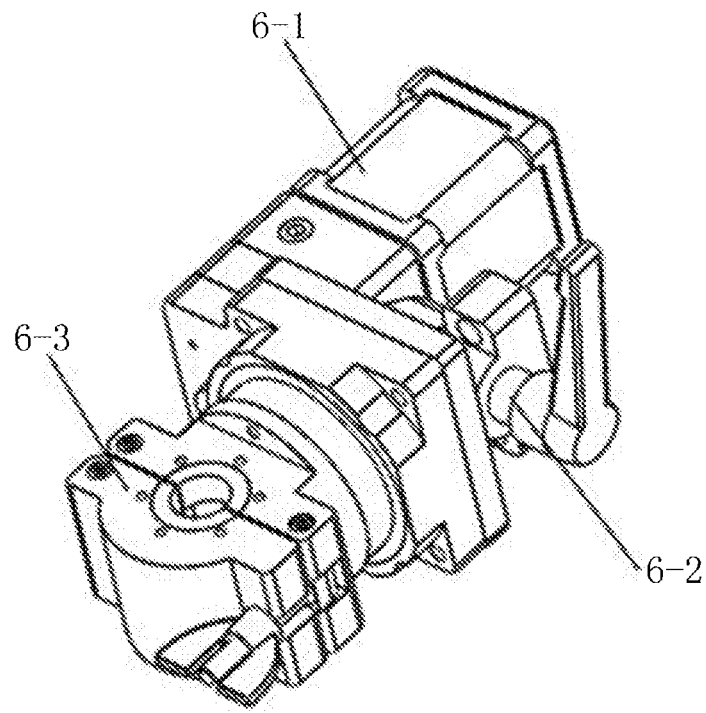
FIG. 8 is a schematic structural view of an angular oscillating and clamping mechanism for welding gun of a crawling welding robot according to an embodiment of the present disclosure.

In order to enable the welding gun 12 to be positioned more accurately during the welding operation and to be adaptable to various processes, in the present disclosure, referring to FIG. 8, optionally, the welding load device 11 further comprises an angular oscillating and clamping mechanism 6 for welding gun, and by means of the angular oscillating and clamping mechanism 6 for welding gun, the welding gun 12 can be rotated about an axis parallel to the y direction to adjust an welding angle of the welding gun 12.

Optionally, in the present disclosure, the angular oscillating and clamping mechanism 6 for welding gun comprises an angular oscillator 6-1, a locking mechanism 6-2, and a clamp 6-3. The angular oscillator 6-1 is connected with the clamp 6-3 for driving the welding gun disposed on the clamp 6-3 to swing or to rotate; the locking mechanism 6-2 is disposed on the angular oscillator 6-1, and is fixedly connected with the first transmission rack 3-3.

Optionally, the angular oscillator 6-1 comprises a stepping motor and a rotary platform with a deceleration function, wherein the rotary platform is connected with the stepping motor, the clamp 6-3 is connected with the rotary platform, the clamp 6-3 is configured to clamp and fix the welding gun 12, the locking mechanism 6-2 can fixedly connect the stepping motor with the first transmission rack 3-3, and the stepping motor drives the rotary platform to rotate so as to drive the welding gun 12 located on the clamp 6-3 to move, so that high-precision rotation or pendular movement of the welding gun 12 can be achieved. During use, after the welding gun 12 is fixed by the clamp 6-3, the stepping motor can be activated to drive the welding gun 12 to rotate or reciprocally swing within a set angle range, and the welding gun 12 can be maintained at a set position to facilitate the welding operation.

Figure 5:
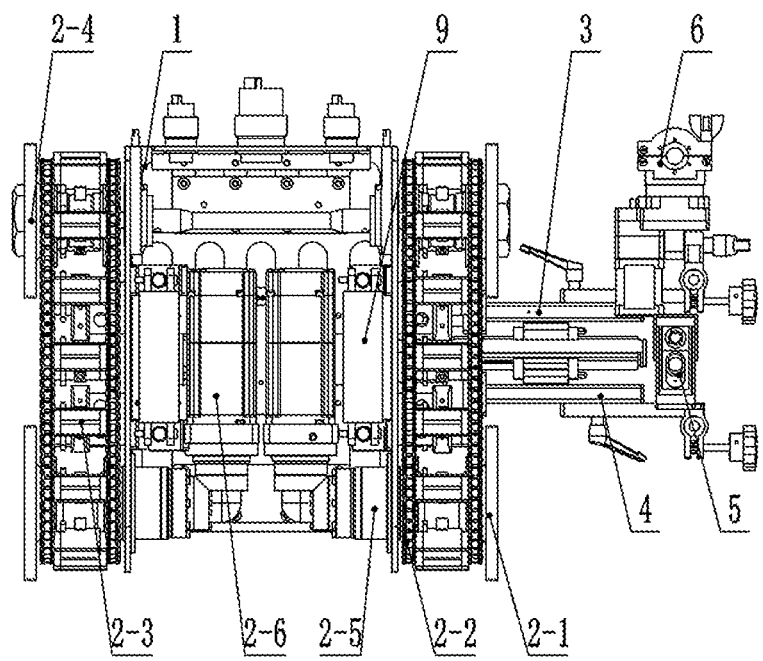
FIG. 5 is a bottom view of a crawling welding robot according to an embodiment of the present disclosure.

In order to ensure that the welding gun 12 can accurately find a welding position and ensure the quality of a weld seam, in the present disclosure, referring to FIG. 5, optionally, the weld holder 10 is provided with a laser tracking linear oscillating mechanism 4 and a laser tracking module 5. The laser tracking linear oscillating mechanism 4 can adjust the position of the laser tracking module 5 in the x direction and in the z direction, so that the laser tracking module 5 can reach an optimal position; the laser tracking module 5 can firstly collect and analyze data on the position to be welded in order to accurately find the position of the weld seam, and then the position and the angle of the welding gun 12 are precisely adjusted by the wheel-tracked walking mechanisms 2 together with the welding gun linear oscillating mechanism 3, and the angular oscillating and clamping mechanism 6 for welding gun, so that the welding gun 12 is matched with the position to be welded, and the welding quality is ensured.

Referring to FIG. 6, optionally, in the present disclosure, the laser tracking linear oscillating mechanism 4 and the welding gun linear oscillating mechanism 3 are located on the two opposite sides of the weld holder 10. The laser tracking linear oscillating mechanism 4 comprises a second linear motor 4-1, a second linear guide rail 4-2, a fourth driving device 4-4, a second transmission gear 4-5, and a second transmission rack 4-3. The second linear motor 4-1 is fixedly disposed on the weld holder 10, the second linear motor and the first linear motor 3-1 are located on the two opposite sides of the weld holder 10, and the second linear guide rail 4-2 is connected with the second linear motor 4-1; the second transmission gear 4-5 is rotatably disposed on the second linear guide rail 4-2, the second transmission rack 4-3 is slidably engaged with the second linear guide rail 4-2, and the second transmission gear 4-5 is meshed with the second transmission rack 4-3; the fourth driving device 4-4 is connected with the second transmission gear 4-5 for driving the second transmission gear 4-5 to rotate so as to drive a linear reciprocating movement of the second transmission rack 4-3.

Optionally, the second linear motor 4-1 can drive a linear movement of the second linear guide rail 4-2 on the weld holder 10 in the x direction, in other words, the second linear motor 4-1, the weld holder 10, and the second linear guide rail 4-2 collectively constitute a screw transmission structure. The second transmission gear 4-5 rotatably disposed on the second linear guide rail 4-2 is engaged with the second transmission rack 4-3 slidably disposed on the second linear guide rail 4-2 to drive the laser tracking module 5 disposed on the second transmission rack 4-3 to move up and down in the z direction, so that the adjustment of the position of the laser tracking module 5 in the x direction and in the z direction can be achieved, and further the adjustment of the laser tracking module 5 in the y direction is achieved by traveling of the wheel-tracked walking mechanisms 2, so that the adjustment of the position of the welding gun 12 in three-dimensional directions is finally achieved.

Optionally, the x direction is set to be parallel to the surface to be adhered and is perpendicular to a walking direction of the wheel-tracked walking mechanism 2, the y direction is set as the walking direction of the wheel-tracked walking mechanism 2, and the z direction is set as a direction perpendicular to the surface to be adhered.

The laser tracking linear oscillating mechanism 4 is provided such that a position to be welded can be accurately found and a precise matching of the welding gun 12 with the position to be welded can be ensured when the crawling welding robot is performing a welding operation.

In the present disclosure, the fourth driving device 4-4 may include a handle or a turntable, the handle or the turntable is connected with the second transmission gear 4-5, and the handle or the turntable is manually rotated to drive the rotation of the second transmission gear 4-5 so as to drive the second transmission rack 4-3 meshed with the second transmission gear 4-5 to reciprocally slide relative to the second linear guide rail 4-2, such that the adjustment of the height of the laser tracking module 5 is finally achieved.

It should be noted that, optionally, the fourth driving device 4-4 may include a motor, an output shaft of the motor is connected with the second transmission gear 4-5, and the motor is communicatively connected with a controller so as to achieve an automatic adjustment of the height of the laser tracking module 5, or the motor is remotely controlled using the controller so as to achieve a remote adjustment of the height of the laser tracking module 5.

Figure 7:
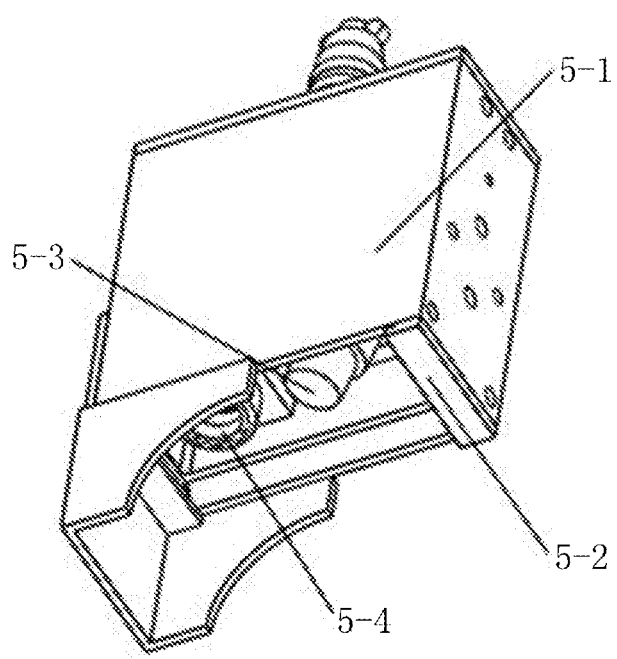
FIG. 7 is a schematic structural view of a laser tracking module of a crawling welding robot according to an embodiment of the present disclosure.

Referring to FIG. 7, optionally, in the present disclosure, the laser tracking module 5 comprises a camera 5-4, a laser sensor 5-3, a mounting frame 5-1, and a multi-filter 5-2. The camera 5-4, the laser sensor 5-3, and the multi-filter 5-2 are all disposed on the mounting frame 5-1; and the mounting frame 5-1 is fixedly disposed on the second transmission rack 4-3.

Optionally, both the laser sensor 5-3 and the camera 5-4 are rotatably disposed on the mounting frame 5-1, and an adjustment of rotation of the laser sensor 5-3 and the camera 5-4 can be achieved so as to adjust observation angles of the laser sensor 5-3 and the camera 5-4.

The multi-filter 5-2 comprises multiple types of combined filters of different specifications, which can effectively filter out the interference from related light sources such as arc light.

In the present disclosure, an advanced system for weld seam recognition and tracking and welding control is used due to the laser sensor 5-3 and the camera 5-4, such that information on the geometry and position of a weld seam can be obtained, thus the welding quality can be ensured. The weld seam can be tracked at an accuracy of up to ±0.3 mm and at a height of within ±0.5 mm, and can be tracked over an unlimited range. The auxiliary welding time can be significantly reduced and the production efficiency is higher, compared with a welding robot for which a rail needs to be laid.

Figure 9:
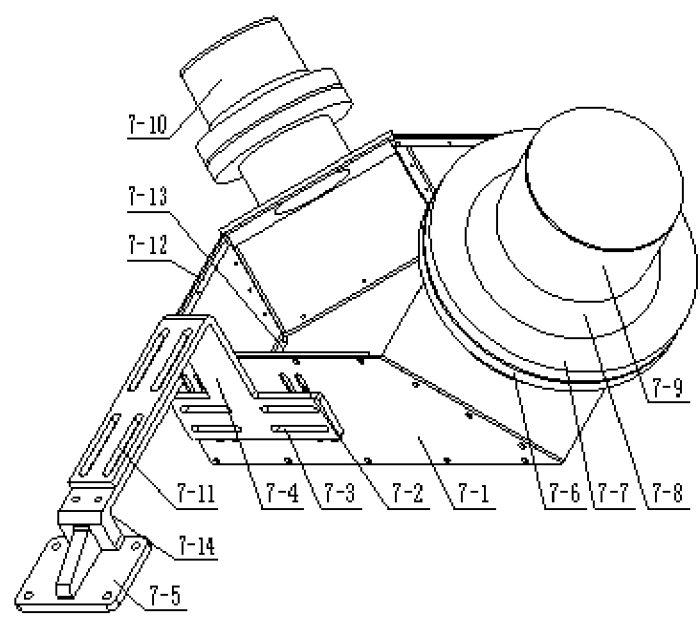
FIG. 9 is a schematic structural view of a windproof device of a crawling welding robot according to an embodiment of the present disclosure.
Figure 10:
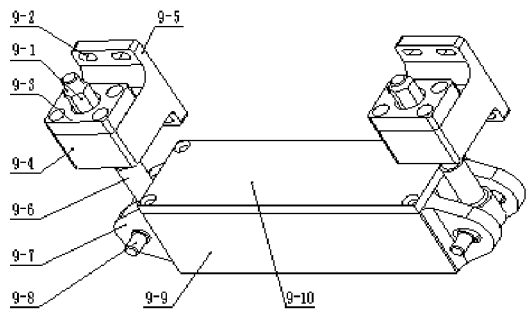
FIG. 10 is a schematic structural view of an adjustable magnetic adhesion module of a crawling welding robot according to an embodiment of the present disclosure.
Figure 13:
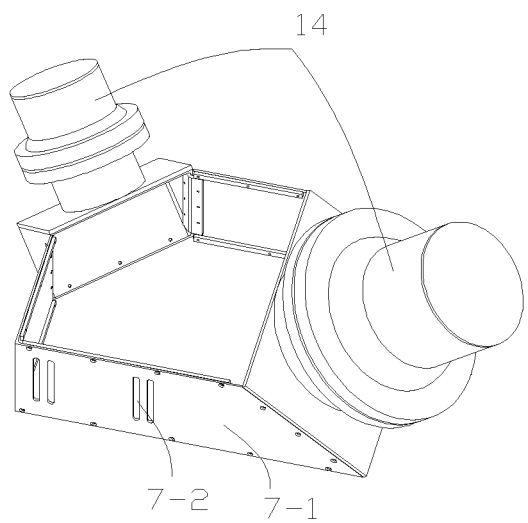
FIG. 13 is a schematic structural view of a windshield according to an embodiment of the present disclosure.

Referring to FIG. 9 and FIG. 13, optionally, the weld holder 10 is further provided with a windproof device 7; wherein the windproof device 7 comprises a fixation support 13 and a windshield 7-1, wherein the fixation support 13 has one end connected with the weld holder 10, and the other end connected with the windshield 7-1; the fixation support 13 comprises an retractable translation plate 7-4, the retractable translation plate 7-4 is provided with slideways 7-3 in a leftward and rightward direction and slideways 7-11 in a frontward and rearward direction, and the windshield 7-1 is provided with slideways 7-2 in an upward and downward direction, so that the windshield 7-1 can be adjusted in the three-dimensional directions, and moreover the windshield 7-1 can be fixed after the adjustment of the position of the windshield 7-1 is finished, so that the windshield 7-1 is maintained at a set position.

In the present disclosure, optionally, the windshield 7-1 is disposed outside the welding gun 12 as a shield, and is fixedly connected with the welding robot via the fixation support 13. When it is necessary to adjust the position of the welding gun 12 due to different welding processes while the welding robot is performing the welding operation, the adjustment of the position of the windshield 7-1 can be achieved by the fixation support 13 on the windshield 7-1, so that the position of the windshield 7-1 is matched with the position of the welding gun 12 to ensure the windproof performance of the windshield 7-1.

Figure 12:
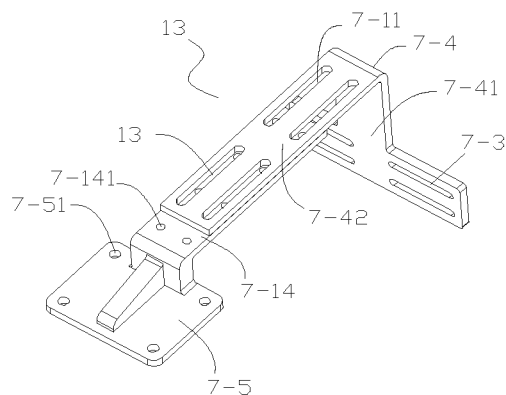
FIG. 12 is a schematic structural view of a fixation support according to an embodiment of the present disclosure.

Referring to FIG. 9 and FIG. 12, in the present disclosure, optionally, the fixation support 13 comprises a fixed bottom plate 7-5, a fixed connection plate 7-14, and an retractable translation plate 7-4, wherein the fixed bottom plate 7-5 is provided with a plurality of fixing holes 7-51, the number of the fixing holes in the present disclosure is four, and the fixed bottom plate 7-5 is fixed to the vehicle body connection plate 1-1 of the welding robot by fixing bolts passing through the corresponding fixing holes. The fixed connection plate 7-14 is fixedly connected with a side surface or a plate surface of the fixed bottom plate 7-5, and the fixed connection may be performed by means of welding, riveting, bolting, integral arrangement, or the like, as long as the fixed bottom plate 7-5 and the fixed connection plate 7-14 can be fixed connected. The retractable translation plate 7-4 is connected with the fixed connection plate 7-14. The retractable translation plate 7-4 and the fixed connection plate 7-14 may be fixedly connected by means of fixing bolts. During mounting, the fixing bolts pass through both first connecting holes 7-141 on the fixed connection plate 7-14 and the slideways 7-11 in the frontward and rearward direction on the retractable translation plate 7-4, and nuts are screwed onto the fixing bolts to achieve the purpose of fixedly connecting the fixed connection plate 7-14 with the retractable translation plate 7-4. The slideways 7-11 in the frontward and rearward direction are provided such that the positions of connection between the fixed connection plate 7-14 and the retractable translation plate 7-4 can be moved and adjusted based on the extension direction of the slideways 7-11 in the frontward and rearward direction, so that the windshield 7-1 can be fixed at a relatively suitable position in the frontward and rearward direction. It should be noted that the number of the slideways 7-11 in the frontward and rearward direction is set as needed. For example, in the present disclosure, the number of the slideways 7-11 in the frontward and rearward direction is four, and the four slideways 7-11 in the frontward and rearward direction are arranged in a rectangular array. Correspondingly, the number of the first connecting holes 7-141 provided on the fixed connection plate 7-14 is set as needed, as long as it is ensured that at least one first connecting hole 7-141 is corresponding to one slideway 7-11 in the frontward and rearward direction. Optionally, in the present disclosure, the number of the first connecting holes 7-141 is eight, each two first connecting holes 7-141 form one group, and the two first connecting holes 7-141 of the same group cooperate with one respective slideway 7-11 in the frontward and rearward direction.

In the present disclosure, optionally, the retractable translation plate 7-4 has a bend, in other words, the retractable translation plate 7-4 comprises a first plate portion 7-41 and a second plate portion 7-42 which are connected and disposed perpendicular to each other. The first plate portion 7-41 and the second plate portion 7-42 may be integrally formed. The slideways 7-11 in the frontward and rearward direction are provided in the second plate portion 7-42, and the slideways 7-3 in the leftward and rightward direction are provided in the first plate portion 7-41. The windshield 7-1 is provided with slideways 7-2 in the upward and downward direction. The fixing bolts pass through the slideways 7-3 in the leftward and rightward direction and the slideways 7-2 in the upward and downward direction and then are tightened by nuts to achieve the purpose of fixedly connecting the retractable translation plate 7-4 with the windshield 7-1. The slideways 7-3 in the leftward and rightward direction are provided such that the positions of connection between the retractable translation plate 7-4 and the windshield 7-1 can be moved and adjusted according to the slideways 7-3 in the leftward and rightward direction, so that the windshield 7-1 can be fixed at a relatively suitable position in the leftward and rightward direction. The slideways 7-2 in the upward and downward direction are provided such that the positions of connection between the retractable translation plate 7-4 and the windshield 7-1 can be moved and adjusted according to the slideways 7-2 in the upward and downward direction, so that the windshield 7-1 can be fixed at a relatively suitable position in the upward and downward direction. It should be noted that the number of the slideways 7-3 in the leftward and rightward direction provided in the first plate portion 7-41 may be four, and the four slideways 7-3 in the leftward and rightward direction are arranged in a rectangular array. The number of the slideways 7-2 in the upward and downward direction provided in the windshield 7-1 may be four, and the four slideways 7-2 in the upward and downward direction are arranged in a rectangular array.

In the present disclosure, optionally, at least two slideways 7-11 in the frontward and rearward direction, at least two slideways 7-3 in the leftward and rightward direction, and at least two slideways 7-2 in the upward and downward direction are provided and are provided symmetrically, respectively, in order to ensure a stable connection between the retractable translation plate 7-4 and the fixed connection plate 7-14 and a stable connection between the retractable translation plate 7-4 and the windshield 7-1.

In the present disclosure, optionally, a bottom edge of the windshield 7-1 is provided with a flexible protective skirt, wherein the flexible protective skirt extends along the circumferential direction of the windshield 7-1 and is annular. The flexible protective skirt is provided such that a rigid collision between the windshield 7-1 and a position to be welded is avoided when the welding robot jolts during movement, which not only protects the windshield 7-1, but also protects the position to be welded, and a gap between the windproof device 7 and a test piece to be welded can also be filled.

Optionally, in the present disclosure, the flexible protective skirt is fixed to the windshield 7-1 by bolts, so that the flexible protective skirt can be conveniently detached and replaced after it is damaged.

It should be noted that, in the present disclosure, the flexible protective skirt and the windshield 7-1 are fixed by bolts, but the flexible protective skirt and the windshield 7-1 are not limited to being fixed by bolts, and may also be fixed by other means, and may, for example, by using rivets or by means of bonding or the like, in other words, as long as the flexible protective skirt can be fixed to the bottom of the windshield 7-1.

Optionally, in the present disclosure, a lower press strip(s) 7-13 is disposed on the flexible protective skirt, and both the lower press strip 7-13 and the flexible protective skirt are fixed to the bottom of the windshield 7-1 by bolts, so that the fitting of the flexible protective skirt to the bottom of the windshield 7-1 can be ensured so as to improve the coverability of the flexible protective skirt to protect the windshield 7-1.

In the present disclosure, optionally, the material of the flexible protective skirt is a high-temperature-resistant flexible material or a metal brush strip.

Since the welding gun 12 is moved axially or horizontally during welding and the windshield 7-1 is fixed and stationary, it is necessary to use a soft connection at positions of connection between the windshield 7-1 and the welding gun 12, so that the windshield 7-1 does not affect the movement of the welding gun 12, while the windproof performance of the windshield 7-1 can also be ensured.

In order to achieve the above functions, in the present disclosure, optionally, cover the top of the windshield 7-1 is provided with a flexible protective cover for the soft connection between the windshield and the welding gun 12.

Optionally, the flexible protective cover is made of a flexible high-temperature-resistant material which is fixedly connected with the edges of the top of the windshield 7-1 by means of bolts and an upper press strip(s) 7-12, and a middle portion of the flexible protective cover is provided with a hole for allowing the welding gun 12 to pass therethrough.

Optionally, the flexible protective cover is connected with the top of the welding gun 12 by using a clamp mechanism, that is to say, the flexible protective cover is wound around the welding gun 12, and is externally locked by the clamp mechanism.

In order to facilitate timely grasping and understanding the welding status in the windshield 7-1, in the present disclosure, optionally, the windshield 7-1 is provided with an observation window 14, wherein the status of the welding gun 12 located inside the windproof device 7 during welding can be observed through the observation window 14.

The observation window 14 includes a transparent window which is provided as a high-temperature-resistant lens, whereby the transparent window is less affected by high temperature during the welding operation, and the service life of the transparent window is prolonged.

Optionally, in the present disclosure, the observation window 14 is rotatably connected with the windshield 7-1.

The observation window 14 is rotated so that the status in the windshield 7-1 can be comprehensively understood and grasped, so as to grasp and handle an accidental situation in time.

Optionally, in the present disclosure, the observation window 14 is rotatably connected with the windshield 7-1 by means of ball connection.

In other words, the observation window 14 is provided with a hinged ball 7-8, and the hinged ball 7-8 is provided with an observation through hole communicating with the observation window 14 and the windshield 7-1; the windshield 7-1 is provided with a fixed flange 7-6, and the hinged ball 7-8 is positioned on the fixed flange 7-6 via a movable flange 7-7.

In other words, after the fixed flange 7-6 is disposed on the windshield 7-1 and the hinged ball 7-8 is disposed on the fixed flange 7-6, the hinged ball 7-8 is fixed to the fixed flange 7-6 via a movable flange 7-7, and the hinged ball 7-8 is partially limited between the fixed flange 7-6 and the movable flange 7-7, so that the hinged ball 7-8 cannot be separated from the fixed flange 7-6 or the movable flange 7-7, and can only rotate between the fixed flange 7-6 and the movable flange 7-7.

The hinged ball 7-8 is provided with an observation through hole having one end communicating with the observation window 14 and the other end communicating with the inside of the windshield 7-1, so that the hinged ball 7-8 does not affect the observation of the inside of the windshield 7-1 through the observation window.

It should be noted that, in the present disclosure, the connection between the observation window 14 and the windshield 7-1 is a ball connection, but it is not limited to the ball connection, and may also be other rotatable connection, as long as an angle of observation through the observation window 14 can be changed by the rotatable connection so as to increase the field of view through the observation window 14.

Optionally, the observation window 14 comprises a primary observation window 7-9 and a secondary observation window 7-10, wherein the primary observation window 7-9 and the secondary observation window 7-10 are disposed at a certain angle with the windshield 7-1, respectively. It should be noted that both the primary observation window 7-9 and the secondary observation window 7-10 can be rotatably connected with the windshield 7-1 via a ball structure.

The observation of the status in the windshield 7-1 through the primary observation window 7-9 and the secondary observation window 7-10 can increase the field of view for observation so as to facilitate a more comprehensive understanding of the status inside the windshield 7-1.

A certain angle is provided between the primary observation window 7-9 and the windshield 7-1 as well as between the secondary observation window 7-10 and the windshield 7-1, so that the damage to the high-temperature-resistant lens caused by splash of slag flying out of the welding gun 12 during welding can be effectively reduced.

Optionally, the angle between the primary observation window 7-9 and the windshield 7-1 is in range of 30° to 60°, and in the present embodiment, the angle between the primary observation window 7-9 and the windshield 7-1 is 45°; the angle between the secondary observation window 7-9 and the windshield 7-1 is in range of 30° to 60°, and in the present embodiment, the angle between the secondary observation window 7-9 and the windshield 7-1 is 45°.

In the present disclosure, the windshield 7-1 is made of a high-temperature-resistant lightweight alloy.

Figure 14:
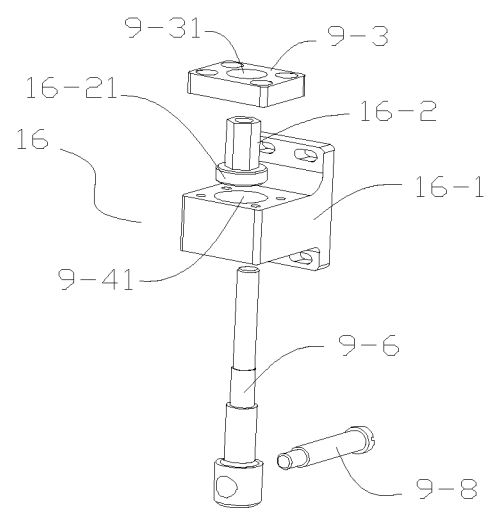
FIG. 14 is a schematic structural view of a lifting adjustment module according to an embodiment of the present disclosure.
Figure 15:
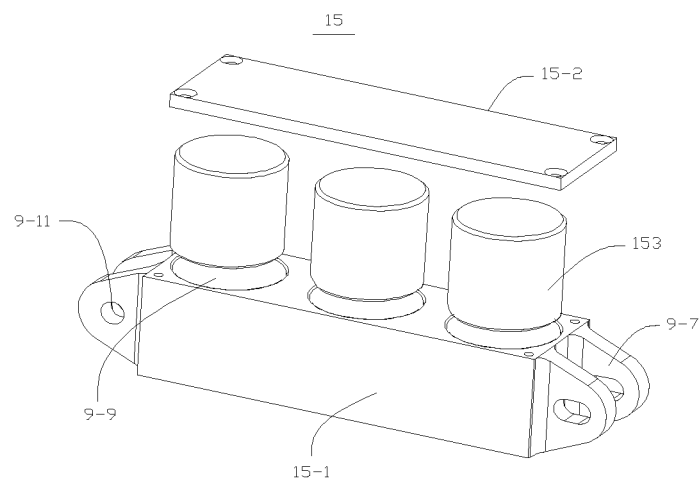
FIG. 15 is a schematic structural view of a magnet module according to an embodiment of the present disclosure.

Referring to FIG. 5, FIG. 14 and FIG. 15, optionally, the adjustable magnetic adhesion module 9 comprises a magnet module 15 and a lifting adjustment module 16, wherein the lifting adjustment module 16 is connected with the magnet module 15 for controlling the lifting and lowering of the magnet module 15; the lifting adjustment module 16 comprises a plurality of independently controllable lifting mechanisms which are adjusted separately to change an angle and/or a gap between the magnet module 15 and the surface to be adhered.

In the present disclosure, the crawling welding robot is enabled by the adjustable magnetic adhesion module 9 to crawl on a flat surface and on a curved surface having a diameter of no greater than 3 meters and to have good adaptability to the working environment.

In the present disclosure, optionally, the magnet module 15 is provided with the lifting adjustment module 16, and the height of the magnet module 15 is adjusted by the lifting adjustment module 16 to achieve an adjustment of a gap between the magnet module 15 and the surface to be adhered.

Such an arrangement enables an adjustment of a magnetic force by the magnet module 15 acting on the surface to be adhered when the surface to be adhered is a curved surface, thereby ensuring the stability of the magnetic force and also ensuring the stability of the magnetic adhesion device on the curved surface.

In the present disclosure, the lifting adjustment module 16 comprises at least two independently controllable lifting mechanisms. The heights of the respective positions of the magnet module 15 are correspondingly adjusted by using different heights lifted or lowered by the respective lifting mechanisms by independently controlling the lifting mechanisms separately, so that an adjustment of an angle between the magnet module 15 and the surface to be adhered is achieved.

Optionally, two lifting mechanisms are provided, and are disposed on two sides of the magnet module 15, respectively.

In use, rollers or tracks for walking are disposed on the two opposite sides of the magnet module 15, the two lifting mechanisms are disposed on the two opposite sides of the magnet module 15, and the two lifting mechanisms are arranged in the same direction as the rollers or tracks. For the magnet module 15, the lifting mechanisms are controlled so that the two ends of the magnet module 15 have different heights, whereby the angle between the magnet module 15 and the surface to be adhered is changed, and thereby it can be ensured that the welding robot has a sufficient magnetic force and adhesion force on different slopes or curvatures during travelling.

Optionally, the lifting adjustment module 16 is specifically provided as a linear driving device.

The lifting adjustment module 16 may perform a unified lifting adjustment, and may continuously adjust the height of the magnet module 15 to ensure its adaptability to any curved surface and slope.

The linear driving device may be provided in several forms. In the present disclosure, optionally, the linear driving device is provided as a turbine-worm mechanism, a hydraulic transmission mechanism, a rack-gear transmission mechanism, a screw transmission mechanism, or the like.

When the turbine-worm mechanism is used as the linear driving device, the magnet module 15 is connected with the worm, and the turbine is rotated to drive a linear movement of the worm to drive a lifting or lowering operation of the magnet module 15 so as to achieve the adjustment of the height of the magnet module 15.

When the hydraulic transmission mechanism is used as the linear driving device, the magnet module 15 is connected with a hydraulic rod. When the hydraulic rod is moved telescopically, the magnet module 15 is driven to perform a lifting or lowering movement to achieve the adjustment of the height of the magnet module 15.

When the rack-gear transmission mechanism is used as the linear driving device, the rack is connected with the magnet module 15, and the gear meshes with the rack. When the gear rotates, the rack is driven to move linearly so as to drive a lifting or lowering movement of the magnet module 15 to achieve the adjustment of the height of the magnet module 15.

When the screw transmission mechanism is used as the linear driving device, a threaded rod is threadedly connected with the magnet module 15, and the threaded rod is fixed to the magnet module 15 in the circumferential direction of the threaded rod. When the threaded rod is rotated, the magnet module 15 moves linearly along the axial direction of the threaded rod so as to drive a lifting or lowering movement of the magnet module 15 to achieve the adjustment of the height of the magnet module 15.

It should be noted that, in the present disclosure, the linear driving device includes any one or more of the several forms above-mentioned, which may be arbitrarily combined with one another.

It should also be noted that the linear driving device may be disposed provided in the several forms above-mentioned, but it is not limited to the several forms above-mentioned, and may also be provided as in other linear forms, such as a crank slider mechanism or the like, in other words, as long as linear lifting or lowering of the magnet module 15 can be achieved by the linear driving device.

Referring to FIG. 14, in the present disclosure, optionally, each lifting mechanism is provided as a threaded lifting adjustment mechanism which comprises a support frame 16-1, a lifting screw 9-6, and an adjusting nut 16-2.

The adjusting nut 16-2 is rotatably disposed on the support frame 16-1, the adjusting nut 16-2 is fixed to the support frame 16-1 in the axial direction of the adjusting nut 16-2, and the adjusting nut 16-2 is threadedly connected with the lifting screw 9-6; and the lifting screw 9-6 is movably connected with the magnet module 15.

Each lifting mechanism is adjusted by means of a threaded screw, and the lifting screw 9-6 is in movable connection to the magnet module 15. The movable connection may be a rotary connection or may be a universal connection, as long as adjustment of both the height and the angle of the magnet module 15 can be achieved.

In the present disclosure, optionally, two mounting ears 9-7 are disposed at the two ends of the magnet module 15, wherein the two mounting ears 9-7 are arranged in parallel at an interval, each mounting ear 9-7 is provided with a rotating hole 9-11, each lifting screw 9-6 is connected with a rotating shaft 9-8, two ends of the rotating shaft 9-8 are inserted into the corresponding rotating holes 9-11, respectively, and the rotating shaft 9-8 is rotatably engaged with the rotating hole 9-11 so as to achieve a rotational connection between the rotating shaft 9-8 and the respective mounting ear 9-7.

In the present disclosure, the adjusting nut 16-2 is rotatably disposed on the support frame 16-1 and is not movable axially on the support frame 16-1, which can not only avoid the disengagement of the adjusting nut 16-2, but also ensure the function of axially fixing the adjusting nut 16-2. The adjusting nut 16-2 is threadedly connected with the lifting screw 9-6. The lifting screw 9-6 can be axially moved by rotating the adjusting nut 16-2, so as to drive the lifting or lowering of one end of the magnet module 15 movably connected with the lifting screw 9-6 to achieve the adjustment of the height of the one end of the magnet module 15.

When the two opposite ends of the magnet module 15 are adjusted in the same direction at the same height, only the gap between the magnet module 15 and the surface to be adhered is changed; and when the two opposite ends of the magnet module 15 are adjusted in different directions and/or adjusted at different heights, the angle between the magnet module 15 and the surface to be adhered is changed.

When the gap or angle between the magnet module 15 and the surface to be adhered is changed, the adhesion force between the magnet module and the surface to be adhered is changed, so that the magnet module 15 can be adapted to different curved environments, and the adhesion force between the magnet module 15 and the surface to be adhered is ensured.

In the present disclosure, optionally, the support frame 16-1 comprises a groove body 9-4 and a cover plate 9-3. The groove body 9-4 is provided with a limiting groove 9-41, wherein the limiting groove 9-41 is a cylindrical groove. The adjusting nut 16-2 is provided with an annular limiting protrusion 16-21, wherein the annular limiting protrusion 16-21 is located at one end of the adjusting nut 16-2, the annular limiting protrusion 16-21 is a cylindrical protrusion, the annular limiting protrusion 16-21 protrudes outwardly, in the radial direction of the adjusting nut 16-2, from the outer circumferential surface of the adjusting nut 16-2, and the annular limiting protrusion 16-21 is coaxial with the adjusting nut 16-2. Optionally, the annular limiting protrusion 16-21 is matched with the limiting groove 9-41. After the one end of the adjusting nut 16-2 having the annular limiting protrusion 16-21 is inserted into the limiting groove 9-41, the annular limiting protrusion 16-21 is rotatably engaged with the limiting groove 9-41, and an end surface of the annular limiting protrusion 16-21 that is remote from the limiting groove 9-41 is substantially flush with an end surface of the limiting groove 9-41 where the groove opening thereof is located. After the adjusting nut 16-2 is disposed in the limiting groove of the groove body 9-4, the cover plate 9-3 is fixedly disposed on the groove body 9-4, and the adjusting nut 16-2 passes through the cover plate 9-3, and the cover plate 9-3 can block the groove opening of the limiting groove 9-41, so that the annular limiting protrusion 16-21 is not disengaged from the limiting groove 9-41 from the cover plate, whereby the adjusting nut 16-2 can be fixed to the groove body 9-4 in the axial direction of the adjusting nut 16-2.

Optionally, the groove body 9-4 is a box-like structure, wherein the groove bottom of the groove body is provided with a through hole for allowing the lifting screw 9-6 to pass therethrough, and the through hole communicates with the groove bottom of the limiting groove 9-41. After the adjusting nut 16-2 is inserted and connected in the limiting groove 9-41, the annular limiting protrusion 16-21 is restrained at the groove bottom of the limiting groove 9-41 without falling from the through hole. A chamfering is provided at and end of the through hole that is remote from the groove bottom of the limiting groove 9-41 to facilitate the mounting of the lifting screw 9-6.

The chamfering may be provided as a rounded angle or a chamfering of 45°×45°, or other types of chamfering, as long as the arrangement of the chamfering can facilitate the mounting of the lifting screw 9-6.

In the present disclosure, the cover plate 9-3 and the groove body 9-4 are fixedly connected by fixing bolts, which can not only facilitate the maintenance and replacement of the adjusting nut 16-2 but also ensure the axial positioning of the adjusting nut 16-2.

It should be noted that, in the present disclosure, the cover plate 9-3 and the groove body 9-4 may be fixedly connected by means of fixing bolts described above, but they are not limited to being disposed in such one manner, and may be fixedly connected by other means, such as pin connection or snap connection or the like, as long as the cover plate 9-3 and the groove body 9-4 can be fixedly connected together by means of a detachable connection.

It should also be noted that, in the present disclosure, the cover plate 9-3 and the groove body 9-4 are detachably connected, and the cover plate 9-3 and the groove body 9-4 may also be provided to be non-detachably connected, and for example, the cover plate 9-3 and the groove body 9-4 may be fixedly connected by means of welding or riveting or the like, as long as the fixed connection between the cover plate 9-3 and the groove body 9-4 can achieve the axial positioning of the adjusting nut 16-2.

The cover plate 9-3 is provided with an adjusting hole 9-31; the adjusting nut 16-2 can protrude upward through the adjusting hole 9-31, whereby the adjustable range of the lifting screw 9-6 is increased.

In order to facilitate the rotation of the adjusting nut 16-2 and facilitate the axially driving the lifting screw 9-6 by the adjusting nut 16-2, in the present disclosure, a driving handle 9-1 is disposed at an end of the adjusting nut 16-2 that is remote from the magnet module 15; wherein the driving handle 9-1 has one end fixedly connected with the adjusting nut 16-2, and the other end passing through the cover plate 9-3 via the adjusting hole.

Such an arrangement enables the driving handle 9-1 to be exposed from the cover plate 9-3, so that a rotation of the adjusting nut 16-2 can be driven outside the support frame 16-1, and then the rotation of the adjusting nut 16-2 drives the lifting screw 9-6 to move axially to finally achieve the adjustment of the height of the magnet module 15.

In the present disclosure, the driving handle 9-1 is disposed coaxially and fixedly relative to the adjusting nut 16-2.

It should be noted that the driving handle 9-1 may be disposed coaxially and fixedly relative to the adjusting nut 16-2, or may be disposed at any position on the side of the adjusting nut 16-2 remote from the magnet module 15, as long as the rotation of the adjusting nut 16-2 can be driven by the driving handle 9-1.

In the present disclosure, the driving handle 9-1 is provided with a through hole allowing the lifting screw 9-6 to pass therethrough. Specifically, the through hole is a threaded hole, and the lifting screw 9-6 is threadedly connected with the driving handle 9-1 through the threaded hole. The threaded hole is provided on the driving handle 9-1 such that the length of the threaded engagement of the lifting screw 9-6 is increased, and thereby the strength of the threaded connection of the lifting screw 9-6 is increased.

It should be noted that, in the present disclosure, the through hole provided on the driving handle 9-1 is a threaded hole, but it is not limited to the threaded hole, and may also be provided as a straight hole, as long as the lifting screw 9-6 is allowed to pass therethrough so that a distance of the axial movement of the lifting screw 9-6 can be increased.

In the present disclosure, the driving handle 9-1 and the adjusting nut 16-2 are fixedly connected in such a manner that they are integrally disposed.

It should be noted that the driving handle 9-1 and the adjusting nut 16-2 may be fixedly connected in such a manner that they are integrally disposed as described in the present disclosure, but they are not limited to being disposed in such one manner, and may also be fixedly connected by other means, such as welding, riveting, threaded connection, or the like, in other words, as long as the driving handle 9-1 can be fixedly connected with the adjusting nut 16-2, and the adjusting nut can be driven in rotation by the driving handle 9-1 so as to drive an axial displacement of the lifting screw 9-6.

In the present disclosure, optionally, the support frame 16-1 comprises a support bottom plate 9-5, wherein the support bottom plate 9-5 is configured to be connected with a welding mechanism.

The support bottom plate 9-5 is provided with a plurality of second connecting holes 9-2. The adjustable magnetic adhesion module 9 is fixedly connected with the welding robot by mounting blots passing through the second connecting holes 9-2, and the adjustable magnetic adhesion module 9 is adhered to the surface to be adhered, so as to achieve the purpose of adhering the welding mechanism to the surface to be adhered, so that the welding operation can be implemented by the welding mechanism.

Optionally, in the present disclosure, the support bottom plate 9-5 is disposed on an outer side wall of the groove body 9-4, and the plurality of support bottom plates 9-5 in the plurality of lifting mechanisms are all disposed on the same side to ensure connection and mounting to the welding mechanism.

It should be noted that the position and direction of each support bottom plate 9-5 can be adjusted according to the shape and the connection position of the welding mechanism, as long as the welding mechanism and the lifting mechanisms can be connected together by the support bottom plates 9-5.

Referring to FIG. 15, in the present disclosure, the magnet module 15 comprises a mounting shell 15-1, a cover body 15-2, and a magnet 15-3, wherein the mounting shell 15-1 is spliced with the cover body 15-2 to form a housing structure with a cavity 9-9, and the magnet 15-3 is disposed in the cavity 9-9.

Optionally, the magnet in the present disclosure is made of high-temperature-resistant neodymium iron boron, the magnet is disposed in the cavity 9-9 in such a manner that the N pole and the S pole are mounted oppositely, the cavity 9-9 is made of an aluminum material which is effective in transmitting a magnetic force, and a cavity cover 9-10 above the cavity 9-9 is made of low carbon steel with good magnetic permeability. Optionally, the housing structure formed by the splicing of the mounting shell 15-1 and the cover body 15-2 has three cavities 9-9, the three cavities 9-9 are linearly arranged, and correspondingly, the number of the magnets is three, and the three magnets are in one-to one correspondence to the three cavities 9-9.

Each cavity 9-9 may be cylindrical, and correspondingly, the respective magnet 15-3 is cylindrical. It should be noted that the number of the cavities 9-9 is not limited to three, and the number of the magnets 15-3 is not limited to three.

With such arrangement, a strong magnetic force can be formed at the bottom of the mounting shell 15-1, and the magnetic force is weaker at the top and each side surface thereof, so that the bottom of the mounting shell 15-1 can be strongly attracted to the surface to be adhered.

Optionally, the crawler frame 1 is further provided with an attitude sensor 8.

The attitude sensor 8 is mounted to the vehicle body connection plate 1-1, and can monitor a motion attitude of the crawling welding robot in real time and feed back a signal to the controller, and the controller feeds back a signal to the wheel-tracked walking mechanisms 2 to achieve an adjustment of their attitude.

As can be seen from the above description, the railless and guideless crawling welding robot according to the present disclosure is controlled by wheel-tracked walking mechanisms to move on a surface of a large or medium-sized flat or curved structural member to be welded, and can vertically crawl along the wall; the crawling welding robot can perform an welding operation when moving either forward or backward. While the crawling welding robot is moving forward for welding, a CCD camera 5-4 in the laser tracking module 5 is responsible for recognition and tracking, and the camera 5-4 in the laser tracking module 5 is responsible for detecting a weld seam after welding and for observing the formed width and the backing height of the weld seam. During the welding, the formed width and the backing height of a weld seam are stored. After the welding is completed, the data are averaged, and the average value has positive guiding significance for the process parameters of the covering.

Figure 11:
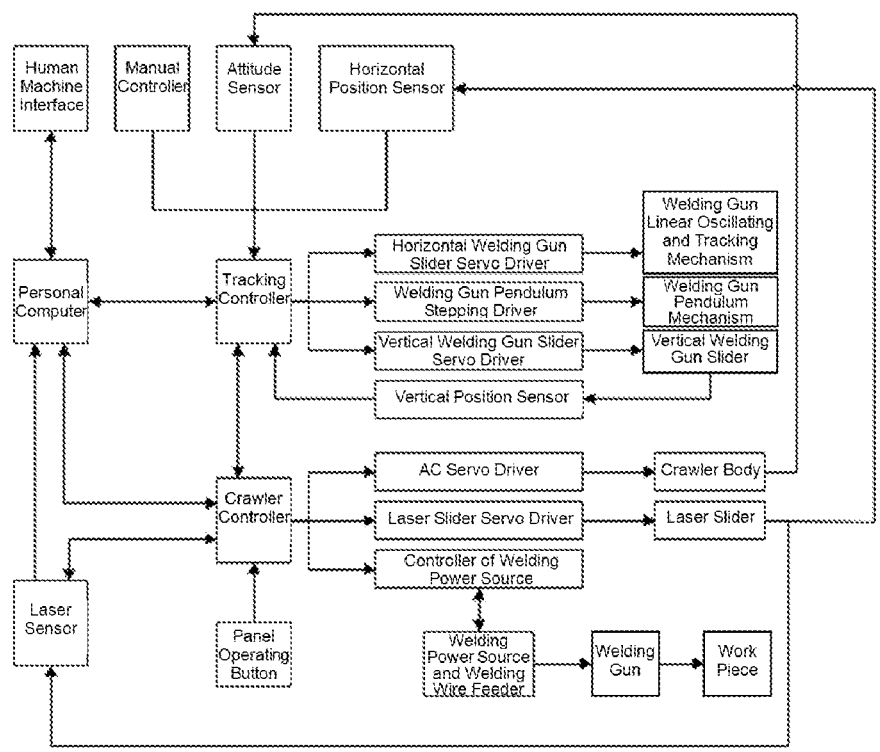
FIG. 11 is a schematic view showing the principle of control of a crawling welding robot according to an embodiment of the present disclosure.

As shown in FIG. 11, the laser tracking module 5 tracks the weld seam based on the following principle:

An image signal detected by the laser sensor 5-3 is transmitted to an industrial personal computer, an image processing software sends the calculated information data on the weld seam to a tracking controller, and the tracking controller sends an instruction causing the welding gun linear oscillating mechanism 3 to control the welding gun 12 to move horizontally to track the weld seam, and instructs the wheel-tracked walking mechanisms 2 to cause the welding gun 12 to track a change in protrusion length of the welding wire; at the same time, the image processing software sends the calculated information data on the weld seam to a master controller of the crawling welding robot, and the master controller transmits information on a change in a weld groove of the weld seam to a controller of a welding power source so as to adjust the process parameters of the welding power source in real time. The welding gun linear oscillating mechanism 3 is provided with a displacement sensor, and a displacement signal generated by the displacement sensor is combined with a vehicle body attitude signal generated by a vehicle body attitude sensor 8 and is calculated and processed by the tracking controller and then transmitted to the master controller of the crawling welding robot to activate the driving devices of the crawling welding robot so that the crawling welding robot is kept parallel to the weld seam so as to perform an welding operation on a flat surface or a curved surface at all positions; and moreover, the crawling welding robot is equipped with a windproof device 7 so as to meet the gas metal arc welding (GMAW) under a condition where the wind speed is no greater than 10 m/s.

A method of controlling a crawling welding robot is characterized by comprising the followings steps of:

S1. controlling an adjustable magnetic adhesion module to maintain a stable adhesion force between the crawling welding robot and a surface to be adhered;

S2. obtaining information on a weld seam;

S3. controlling the welding gun 12 to translate to the position of the weld seam;

S4. controlling the welding gun 12 to rotate to an angle required for the process;

S5. adjusting process parameters of a welding power source;

S6. starting welding and controlling the crawling robot to automatically and autonomously crawl along the profile (direction) of the weld seam; and S7. finishing welding.

Optionally, 1. in the step S2, the positional coordinates, the reliability, and the image signal of the weld seam information are measured by the laser sensor 5-3;
2. the industrial personal computer performs signal processing on the above weld seam information and then transmits the same to the tracking controller and the controller of the welding power source;
3. the tracking controller sends an instruction according to the weld seam information;
4. according to the weld seam instruction, the welding gun linear oscillating mechanism 3 and the angular oscillating and clamping mechanism 6 for welding gun enable the welding gun 12 to move to track the weld seam and maintain a protrusion length of the welding wire;
5. when the welding gun 12 is moved by the welding gun linear oscillating mechanism 3 and the angular oscillating and clamping mechanism 6 for welding gun, a displacement signal of the welding gun 12 is sent;
6. when the crawling welding robot is moving, the attitude sensor 8 on the vehicle body sends a vehicle body attitude signal;
7. the tracking controller calculates and processes the input data in the step 1, step 5, and step 6 in combination;
8. the tracking controller sends the processed data to the master controller of the crawling welding robot;
9. after calculation, the master controller of the crawling welding robot sends an instruction to cause two serve motors 2-6 to respectively drive two drive wheels 2-1 to rotate at different speeds, so that the crawling welding robot performs a steering motion;
10. after the master controller of the crawling welding robot performs a calculation based on the received image signal of position, the laser tracking module 5 is driven to move by the wheel-tracked walking mechanisms 2, so that the camera 5-4 can always lock onto the weld seam;
11. the controller of the welding power source sends an instruction according to the weld seam information to adjust the process parameters of the welding power source in real time;
12. oscillation software of a master computer sets corresponding welding oscillation parameters according to the welding processes, which include control parameters such as welding type, linear oscillation, pendulum, oscillation amplitude, oscillation speed, and pause time, and the control parameters are sent to the tracking controller after they are set;
13. the tracking controller enables an oscillation of the welding gun 12 by the angular oscillating and clamping mechanism 6 for welding gun based on the welding oscillation parameters received from the master computer;
14. a manual controller connected with the tracking controller controls welding parameters that require micro-adjustment or manual intervention during the welding;
15. vehicle body control software of the master computer sets corresponding vehicle body control parameters according to the welding processes, which include an automatic travelling reference speed, a manual travelling speed, and setting parameter contents, and the master controller of the crawling welding robot receives and stores the set process parameters and travels according to the set values.

The position of the welding gun 12 is controlled in the following manner:

1. the crawling welding robot controls the wheel-tracked walking mechanisms 2 to run in a differential manner to achieve the steering of the crawling welding robot, which can realize a 360° pivot steering;
2. the welding gun linear oscillating mechanism 3, the laser tracking linear oscillating mechanism 4, and the wheel-tracked walking mechanisms 2 achieve the adjustment of the position of the welding gun 12 to adjust the protrusion length of the welding wire of the welding gun 12;
3. the angular oscillating and clamping mechanism 6 for welding gun controls the angular oscillation of the welding gun 12 by means of step drive (including a reducer) to meet requirements of certain welding processes.

The present disclosure brings the following advantages over the prior art:

1. The wheel-tracked walking mechanisms 2 enables crawling without rails or guides, so that the weldable range is large; the auxiliary welding time can be significantly reduced, and the production efficiency is high; and the welding of the large and medium-sized structural members at all positions can be achieved.
2. The magnitude of the magnetic adhesion force is adjusted by the adjustable magnetic adhesion module, so that the crawling welding robot can crawl on a flat plate and a curved plate with large curvature and has high adaptability to the working environment.
3. Reliable tracking of weld seams can be achieved by using advanced weld seam recognition and multi-sensor data fusion technologies, therefore the welding quality can be ensured, and the weld seam can be tracked at an accuracy of up to ±0.3 mm and at a height of within ±0.5 mm, and can be tracked over an unlimited range.

4. The crawling welding robot is equipped with a windproof device 7 so as to meet the gas metal arc welding (GMAW) under a condition where the wind speed is not more than 10 m/s.
5. Relevant information such as the width of the weld seam is obtained by image acquisition and is fed back to the master controller of the crawling welding robot, and the master controller of the crawling welding robot adjusts the controller of the welding power source to achieve the adjustment of the voltage and current of the welding power source, which can meet a real-time adjustment of the welding processes when the weld seam irregularly changes.

The crawling welding robot according to the present disclosure is enabled by the wheel-tracked walking mechanisms 2 to crawl without rails or guides, has a large weldable range, can move on the surfaces of large and medium-sized flat or curved structural members to be welded, can vertically crawl on the wall, and can perform a welding operation when moving either forward or backward, so that the welding of the large and medium-sized structural members at all positions is achieved, the auxiliary welding time can be significantly reduced, and the production efficiency is high; the magnitude of the magnetic adhesion force is adjusted by the adjustable magnetic adhesion module 9, so that the crawling welding robot can crawl on a flat plate and a curved plate with large curvature and has high adaptability to the working environment.

Finally it should be noted that the above embodiments are merely intended to illustrate the technical solutions of the present disclosure, and are not intended to limit the present disclosure. Although the present disclosure has been described in detail with reference to the foregoing embodiments, it will be understood by those of ordinary skill in the art that the technical solutions described in the foregoing embodiments may be modified, or some or all of the technical features thereof may be equivalently replaced; and the modifications or replacements will not cause the essence of the corresponding technical solutions to depart from the scope of the technical solutions of the embodiments of the present disclosure.

In addition, it can be understood by those skilled in the art that while some embodiments herein include some but not other features included in other embodiments, combinations of features of different embodiments are meant to be within the scope of the present disclosure, and to form different embodiments. For example, in the appended claims, any one of the claimed embodiments can be used in any combination. Information disclosed in the Background Art section is only intended to deepen understanding of the overall background art of the present disclosure, and shall not be deemed as admitting or implying in any form that the information constitutes the prior art well known to those skilled in the art.

INDUSTRIAL APPLICABILITY

In summary, the present disclosure provides a crawling welding robot and a method of controlling the same, which has a wide operating range and high operating efficiency.

What is claimed is:
1. A crawling welding robot, comprising:
an adjustable magnetic adhesion module;
wheel-tracked walking mechanisms;
a crawler frame; and
a welding load device, wherein the welding load device is disposed on the crawler frame;
the wheel-tracked walking mechanisms being disposed at two opposite ends of the crawler frame for supplying power for crawling of the crawler frame;
the adjustable magnetic adhesion module being disposed on the crawler frame and disposed between two wheel-tracked walking mechanisms;
the adjustable magnetic adhesion module comprises a magnet module and a lifting adjustment module, and the lifting adjustment module is connected with the magnet module for controlling lifting and lowering of the magnet module; and
the lifting adjustment module comprises a plurality of independently controllable lifting mechanisms, and an angle and/or a gap between the magnet module and a surface to be adhered is changed by separately adjusting the plurality of independently controllable lifting mechanisms;
wherein each lifting mechanism comprises a support frame, a lifting screw, and an adjusting nut, the support frame is connected with the crawler frame, the lifting screw is screwed with the adjusting nut, the adjusting nut is rotatably connected with the support frame, and the adjusting nut is fixed to the support frame in an axial direction of the adjusting nut and the lifting screw is connected with the magnet module.

2. The crawling welding robot according to claim 1, wherein each wheel-tracked walking mechanism comprises a magnetic base, a roller chain, a drive wheel, a driven wheel, and a first driving device;
the first driving device is fixedly disposed on the crawler frame;
both the drive wheel and the driven wheel are rotatably disposed on the crawler frame;
the drive wheel and the driven wheel are connected by the roller chain; and
the magnetic base is disposed on the roller chain.

3. The crawling welding robot according to claim 2, wherein the crawler frame is provided with a sliding slot;
the driven wheel is slidably disposed in the sliding slot; and
the crawler frame is provided with a second driving device configured to drive the driven wheel to move in the sliding slot so that the corresponding roller chain is tensioned or slackened.

4. The crawling welding robot according to claim 3, wherein the crawler frame comprises an adjusting block and an adjusting screw, the adjusting block is slidably engaged with the sliding slot, the adjusting screw is screwed with the crawler frame, the adjusting screw is rotatably connected with the adjusting block, and the adjusting screw is fixed relative to the adjusting block in an axial direction of the adjusting screw; when the adjusting screw is rotated, the adjusting block is slidable in the sliding slot; and the driven wheel is rotatably connected with the adjusting block.

5. The crawling welding robot according to claim 3, wherein the crawler frame comprises an adjusting block and an adjusting screw, the adjusting block is slidably engaged with the sliding slot, the adjusting screw is screwed with the crawler frame, and the adjusting screw is fixed to the crawler frame in an axial direction of the adjusting screw, and the adjusting screw is rotatably connected with the adjusting block; when the adjusting screw is rotated, the adjusting block is slidable in the sliding slot; and the driven wheel is rotatably connected with the adjusting block.

6. The crawling welding robot according to claim 2, wherein the first driving device comprises a servo motor and a corner deceleration motor, the servo motor is connected with the corner deceleration motor, both the servo motor and the corner deceleration motor are fixed to the crawler frame, the drive wheel is fixed to a flange of the corner deceleration motor, and the drive wheel can be driven to rotate by the servo motor.

7. The crawling welding robot according to claim 1, wherein the crawler frame comprises a vehicle body connection plate and two side plates which are connected with the vehicle body connection plate and are oppositely disposed, and the two wheel-tracked walking mechanisms are mounted to the two side plates, respectively.

8. The crawling welding robot according to claim 1, wherein the welding load device comprises a weld holder and a welding gun linear oscillating mechanism;
   the weld holder is fixedly disposed on the crawler frame;
   the welding gun linear oscillating mechanism comprises a first linear motor, a first linear guide rail, a third driving device, a first transmission gear, and a first transmission rack; and
   the first linear motor is fixedly disposed on the weld holder, and the first linear guide rail is connected with the first linear motor; the first transmission gear is rotatably disposed on the first linear guide rail; the first transmission gear is meshed with the first transmission rack, and the first transmission rack is slidably engaged with the first linear guide rail; the third driving device is connected with the first transmission gear for driving the first transmission gear to rotate so as to drive the first transmission rack to reciprocally slide relative to the first linear guide rail.

9. The crawling welding robot according to claim 8, wherein the welding load device further comprises an angular oscillating and clamping mechanism for welding gun;
   the angular oscillating and clamping mechanism for welding gun comprises an angular oscillator, a locking mechanism, and a clamp;
   the angular oscillator is connected with the clamp for driving and a welding gun disposed on the clamp to swing; and
   the locking mechanism is disposed on the angular oscillator and is fixedly connected with the first transmission rack.

10. The crawling welding robot according to claim 9, wherein the angular oscillator comprises a motor and a rotary platform which are connected with each other, the clamp is connected with the rotary platform, and the locking mechanism is connected with the motor.

11. The crawling welding robot according to claim 8, wherein the welding load device further comprises a laser tracking linear oscillating mechanism and a laser tracking module;
   the laser tracking linear oscillating mechanism comprises a second linear motor, a second linear guide rail, a fourth driving device, a second transmission gear, and a second transmission rack; and
   the second linear motor is fixedly disposed on the weld holder, and the second linear guide rail is connected with the second linear motor;
   the second transmission gear is rotatably disposed on the second linear guide rail;
   the second transmission gear is meshed with the second transmission rack, and the second transmission rack is slidably engaged with the second linear guide rail; and
   the fourth driving device is connected with the second transmission gear for driving the second transmission gear to rotate so as to drive a linear reciprocating movement of the second transmission rack.

12. The crawling welding robot according to claim 11, wherein the laser tracking module comprises a camera, a laser sensor, a mounting frame, and a multi-filter;
   the camera, the laser sensor, and the multi-filter are all disposed on the mounting frame; and
   the mounting frame is fixedly disposed on the second transmission rack.

13. The crawling welding robot according to claim 1, wherein the crawling welding robot further comprises a windproof device, and the windproof device is connected with the crawler frame;
   the windproof device comprises a fixation support and a windshield which are connected with each other, and the fixation support is connected with the crawler frame; and
   the fixation support comprises an retractable translation plate that can be extended and contracted in a frontward and rearward direction, the retractable translation plate is provided with a slideway in a leftward and rightward direction and a slideway in the frontward and rearward direction which have an angle formed therebetween, the windshield is provided with a slideway in an upward and downward direction, the retractable translation plate is connected with the windshield, and the windshield is slippable relative to the retractable translation plate in an extension direction of the slideway in the upward and downward direction and in an extension direction of the slideway in the leftward and rightward direction, so that the windshield can be adjusted in the three directions.

14. The crawling welding robot according to claim 13, wherein the fixation support further comprises a fixed bottom plate and a fixed connection plate which are connected with each other, and the fixed connection plate is slidably engaged with the retractable translation plate in an extension direction of the slideway in the frontward and rearward direction; and the fixed bottom plate is configured to be connected with the crawler frame.

15. The crawling welding robot according to claim 13, wherein the retractable translation plate comprises a first plate portion and a second plate portion which are connected with each other, an angle is formed between the first plate portion and the second plate portion, the slideway in the leftward and rightward direction is provided in the first plate portion, and the slideway in the frontward and rearward direction is provided in the second plate portion; the first plate portion is slidably connected with the windshield, and the second plate portion is slidably connected with a fixed connection plate.

16. The crawling welding robot according to claim 1, wherein the magnet module comprises a mounting shell, a cover body, and a magnet, the mounting shell is provided with a cavity, the magnet is placed in the cavity, and the cover body is connected with the mounting shell for covering the cavity.

17. The crawling welding robot according to claim 1, wherein the support frame comprises a groove body and a cover plate, and the groove body is provided with a limiting groove; the adjusting nut is provided with an annular limiting protrusion, the annular limiting protrusion extends in a circumferential direction of the adjusting nut, and the annular limiting protrusion protrudes outwardly, in a radial direction of the adjusting nut, from an outer circumferential surface of the adjusting nut; the annular limiting protrusion is located in the limiting groove, and the cover plate is connected with the groove body and is configured to cover a groove opening of the limiting groove, so that the annular limiting protrusion is restrained between a cover body and a groove bottom of the limiting groove.

18. A method of controlling a crawling welding robot, comprising:

controlling an adjustable magnetic adhesion module to maintain a stable adhesion force between the crawling welding robot and a surface to be adhered, the adjustable magnetic adhesion module comprising a magnet module and a lifting adjustment module, the lifting adjustment module connected with the magnet module for controlling lifting and lowering of the magnet module; the lifting adjustment module comprising a plurality of independently controllable lifting mechanisms, wherein an angle and/or a gap between the magnet module and the surface to be adhered is changed by separately adjusting the plurality of independently controllable lifting mechanisms;

obtaining information on a weld seam;

controlling a welding gun to translate to a position of the weld seam;

controlling the welding gun to rotate to an angle required for a process;

adjusting process parameters of a welding power source;

starting welding and controlling the crawling welding robot to automatically and autonomously crawl along a direction of the weld seam; and finishing the welding;

wherein the crawling welding robot comprises a lifting mechanism, and wherein each lifting mechanism comprises a support frame, a lifting screw, and an adjusting nut, the support frame is connected with the crawler frame, the lifting screw is screwed with the adjusting nut, the adjusting nut is rotatably connected with the support frame, and the adjusting nut is fixed to the support frame in an axial direction of the adjusting nut and the lifting screw is connected with the magnet module.

* * * * *